United States Patent
Takeuchi

(10) Patent No.: US 11,465,288 B2
(45) Date of Patent: Oct. 11, 2022

(54) METHOD OF CONTROLLING ROBOT

(71) Applicant: Seiko Epson Corporation, Tokyo (JP)

(72) Inventor: Kaoru Takeuchi, Azumino (JP)

(73) Assignee: SEIKO EPSON CORPORATION

(*) Notice: Subject to any disclaimer, the term of this patent is extended or adjusted under 35 U.S.C. 154(b) by 321 days.

(21) Appl. No.: 16/881,118

(22) Filed: May 22, 2020

(65) Prior Publication Data

US 2020/0368911 A1 Nov. 26, 2020

(30) Foreign Application Priority Data

May 24, 2019 (JP) .............................. JP2019-097490

(51) Int. Cl.
- *B25J 19/00* (2006.01)
- *B25J 9/16* (2006.01)
- *B25J 9/00* (2006.01)
- *B25J 13/08* (2006.01)
- *B25J 5/00* (2006.01)
- *B25J 9/12* (2006.01)

(52) U.S. Cl.
CPC ............ *B25J 9/1684* (2013.01); *B25J 9/0009* (2013.01); *B25J 9/162* (2013.01); *B25J 9/1633* (2013.01); *B25J 9/1694* (2013.01); *B25J 13/085* (2013.01); *B25J 13/088* (2013.01); *B25J 5/007* (2013.01); *B25J 9/12* (2013.01)

(58) Field of Classification Search
CPC ... B25J 5/007; B25J 9/0009; B25J 9/12; B25J 9/162; B25J 9/1633; B25J 9/1684; B25J 9/1694; B25J 13/085; B25J 13/088
See application file for complete search history.

(56) References Cited

U.S. PATENT DOCUMENTS

| | | | |
|---|---|---|---|
| 2009/0248201 A1* | 10/2009 | Habisreitinger | B23P 21/00 700/245 |
| 2017/0341221 A1 | 11/2017 | Hashimoto et al. | |
| 2017/0371342 A1* | 12/2017 | Hashimoto | G05D 1/0234 |
| 2019/0099879 A1* | 4/2019 | Haddadin | B25J 9/1633 |
| 2020/0198151 A1* | 6/2020 | Hirata | B25J 15/0253 |
| 2020/0269429 A1* | 8/2020 | Chavez | B25J 15/0052 |

FOREIGN PATENT DOCUMENTS

| | | |
|---|---|---|
| JP | 2015-174171 A | 10/2015 |
| WO | 2016-103303 A1 | 6/2016 |
| WO | 2016-103304 A1 | 6/2016 |

\* cited by examiner

*Primary Examiner* — Dale Moyer
(74) *Attorney, Agent, or Firm* — Harness, Dickey & Pierce, P.L.C.

(57) ABSTRACT

A method of controlling a robot that performs work using an end effector on an object transported by a handler includes calculating a target position of the end effector based on a position of the object, calculating a tracking correction amount for correction of the target position in correspondence with a transport amount of the object, controlling the end effector to follow the object based on the target position and the tracking correction amount, acquiring an acting force acting on the end effector from the object using a force sensor, calculating a force control correction amount for correction of the target position to set the acting force to a target force, and controlling the acting force to be the predetermined target force by driving the manipulator based on the force control correction amount.

8 Claims, 10 Drawing Sheets

| | FORCE CONTROL CORRESPONDING COMMAND | POSITION CONTROL COMMAND |
|---|---|---|
| CP | Move, TMove, BMove, CVMove, Arc, Arc3, FCSMove | Move, TMove, BMove, CVMove, Arc, Arc3, FCSMove |
| PTP | | Pass, Pulse, Go, TGo, BGo, JTran, PTran |
| CP+PTP | | Jump, Jump3 |
| OTHERS | FCKeep | Jump3CP |

METHOD OF CONTROLLING ROBOT

The present application is based on, and claims priority from JP Application Serial Number 2019-097490, filed May 24, 2019, the disclosure of which is hereby incorporated by reference herein in its entirety.

BACKGROUND

1. Technical Field

The present disclosure relates to a method of controlling a robot.

2. Related Art

JP-A-2015-174171 discloses a robot control apparatus that controls a robot performing work on a work transported by a handler.

However, in the technique disclosed in JP-A-2015-174171, the work may be out of the movable range of the robot before the work on the work is completed depending on the time taken for the work.

SUMMARY

A first embodiment is directed to a method of controlling a robot that performs work using an end effector on an object transported along a predetermined path by a handler and includes a manipulator supporting the end effector, a base supporting the manipulator, and a moving unit moving the base by a control apparatus, and the method includes acquiring a position of the object using a position sensor, calculating a target position of the end effector based on the position of the object, acquiring a transport amount of the object by the handler, calculating a tracking correction amount for correction of the target position in correspondence with the transport amount, controlling the end effector to follow the object by driving the manipulator based on the target position and driving the moving unit based on the tracking correction amount, acquiring an acting force acting on the end effector from the object using a force sensor, calculating a force control correction amount for correction of the target position to set the acting force to a predetermined target force, and controlling the acting force from the object to be the predetermined target force by driving the manipulator based on the force control correction amount.

A second embodiment is directed to the first embodiment, in which, when the target position is out of a first range with reference to a position of the base, the moving unit may be driven based on the tracking correction amount.

A third embodiment is directed to the first or second embodiment, in which, when the tracking correction amount is equal to or larger than a first threshold value, the moving unit may be driven based on the tracking correction amount.

A fourth embodiment is directed to a method of controlling a robot that performs work using an end effector on an object transported along a predetermined path by a handler and includes a manipulator supporting the end effector, a base supporting the manipulator, and a moving unit moving the base by a control apparatus, and the method includes acquiring a position of the object using a position sensor, calculating a target position of the end effector based on the position of the object, acquiring a transport amount of the object by the handler, calculating a tracking correction amount for correction of the target position in correspondence with the transport amount, controlling the end effector to follow the object by driving the manipulator based on the target position, the tracking correction amount, and a movement amount of the moving unit while driving the moving unit along the path, acquiring an acting force acting on the end effector from the object using a force sensor, calculating a force control correction amount for correction of the target position to set the acting force to a predetermined target force, and controlling the acting force from the object to be the predetermined target force by driving the manipulator based on the force control correction amount.

A fifth embodiment is directed to any one of the first to fourth embodiments, in which, when the force control correction amount is used for correction of the target position in a path direction along the path, the moving unit may be driven based on a component of the force control correction amount in the path direction and the manipulator is driven based on another than the component of the force control correction amount in the path direction.

A sixth embodiment is directed to the fifth embodiment, in which, when the target position is out of a second range with reference to a position of the base, the moving unit may be driven based on the component of the force control correction amount in the path direction.

A seventh embodiment is directed to the fifth or sixth embodiment, in which, when the component of the force control correction amount in the path direction is equal to or larger than a second threshold value, the moving unit may be driven based on the component of the force control correction amount in the path direction.

An eighth embodiment is directed to any one of the first to seventh embodiments, in which an initial position of the base at a start of the work may be determined to reduce a movement amount of the moving unit based on a movable range of the end effector with reference to a position of the base.

DESCRIPTION OF EXEMPLARY EMBODIMENTS

Figure 1:
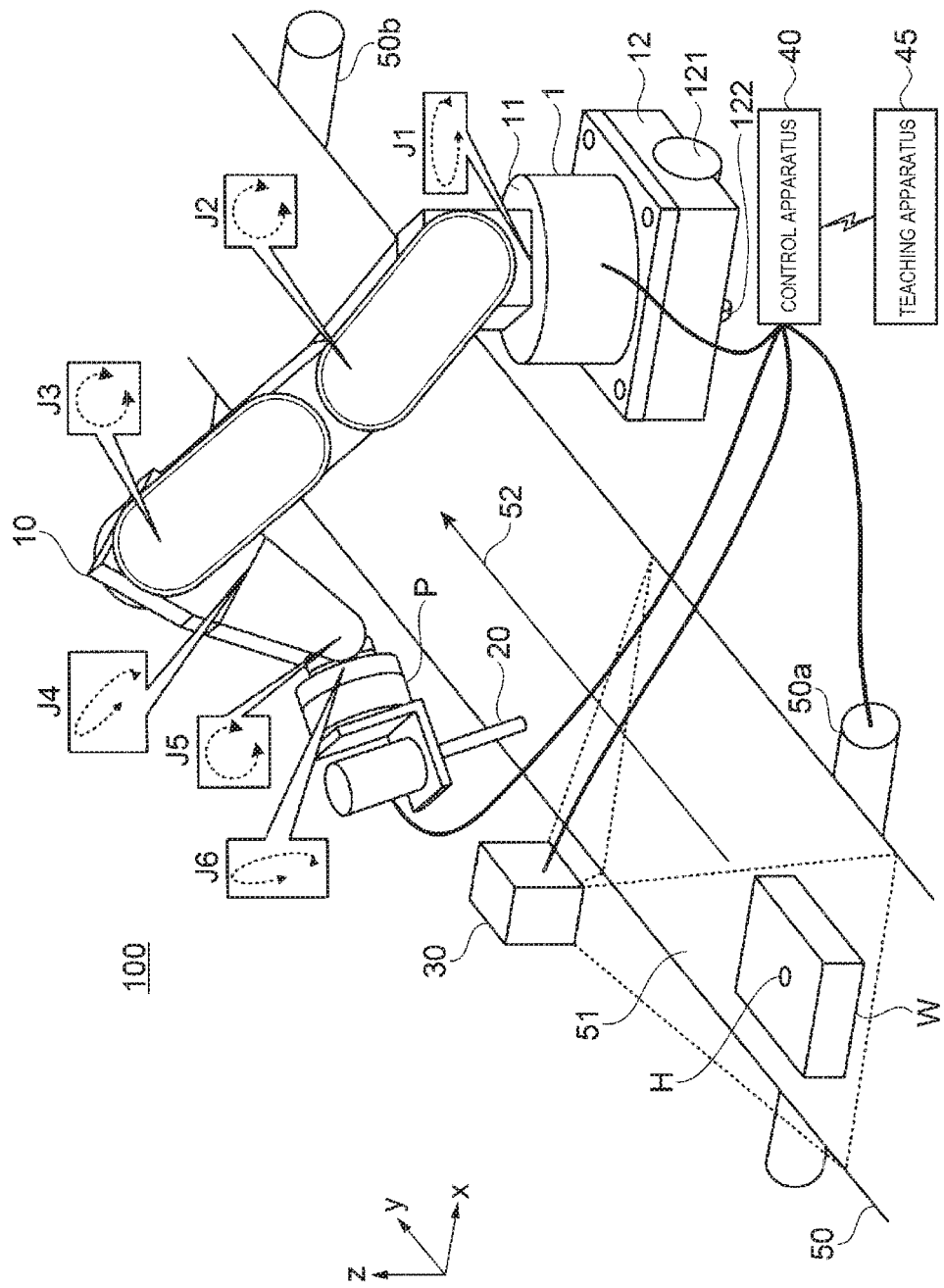
FIG. 1 is a perspective view showing a schematic configuration of a robot system.

As below, embodiments will be explained with reference to the drawings. In the drawings, the same or similar elements respectively have the same or similar signs and duplicated explanations will be omitted.

As shown in FIG. 1, a robot system 100 according to the embodiment includes a robot 1, an end effector 20, a position sensor 30, a control apparatus 40, a teaching apparatus 45, and a handler 50. The robot 1 performs work on an object W transported along a predetermined path 51 by the handler 50 using the end effector 20. The robot 1 includes a manipulator 10 supporting the end effector 20, a base 11 supporting the manipulator 10, and a moving unit 12 moving the base 11. As the robot 1, e.g. a general-purpose robot that can perform various kinds of work by teaching by the teaching apparatus 45 may be employed.

The manipulator 10 is a robotic arm having e.g. pluralities of mutually coupled links and joints and moving at a plurality of degrees of freedom. In the example shown in FIG. 1, the manipulator 10 is a six-axis arm having six joints J1 to J6. The joints J2, J3, J5 are bending joints and the joints J1, J4, J6 are twisting joints. The end effector 20 is a tool such as e.g. a screw driver, gripper, or grinder. The end effector 20 performs various kinds of work including e.g. screwing, gripping, and machining on the object W as a work. The end effector 20 is attached to the joint J6 via a mechanical interface in the distal end portion of the manipulator 10. The manipulator 10 is driven by the control apparatus 40, and thereby, determines the position and posture of the end effector 20.

For the manipulator 10, a tool center point (TCP) as a reference for the position of the end effector 20 is set in a predetermined position near the distal end. The TCP can be arbitrarily set and, for example, is set on the rotation axis of the joint J6. When a screw driver is used as the end effector 20, the distal end of the screw driver can be set as the TCP. Note that, in the embodiment, the manipulator 10 has the degree of freedom of six axes as an example. The manipulator 10 may use any joint mechanism as long as the robot can realize the movement of the TCP necessary for the work on the object W. The base 11 positions the first link of the manipulator 10, i.e., the single link closest to the base 11.

For example, the manipulator 10 has a force sensor P for acquisition of an acting force acting on the object W from the end effector 20. The force sensor P is a force sensor that measures forces along three axes and torque about three axes acting on the work W in a sensor coordinate system as an intrinsic three-dimensional orthogonal coordinate system. In the example shown in FIG. 1, the force sensor P is attached to the joint J6, however, at least one of the other joints J1 to J5 may have the force sensor.

The moving unit 12 includes e.g. a pair of driving wheels 121 and one driven wheel 122. The moving unit 12 is e.g. an automated guided vehicle (AGV) driven according to control by the control apparatus 40. The moving unit 12 rotates the pair of driving wheels 121 in the same direction and at the same speed as each other according to the control by the control apparatus 40, and thereby, moves the base 11 in one direction. The moving unit 12 may change the orientation of the base 11 in the x-y plane, i.e., the angle of traverse about the z-axis with balance of the rotation direction and the rotation speed of the pair of driving wheels 121 controlled by the control apparatus 40. The moving unit 12 is driven in a path direction 52 along the path 51 during the work on the object W transported by the handler 50, and thereby, moves the base 11 in the path direction 52. The path direction 52 is a direction having a component of a first direction in which the object W is transported, but not having a component of a second direction opposite to the first direction. That is, the path direction 52 is not necessarily parallel to the first direction. The moving unit 12 may be any device as long as the device moves at least along the path 51 according to the control by the control apparatus 40.

The xyz coordinate system shown in FIG. 1 is a world coordinate system set with respect to the floor surface on which the robot 1 is placed. The world coordinate system is a three-dimensional orthogonal coordinate system defined by an x-axis and a y-axis orthogonal to each other along the horizontal plane and a z-axis in a vertically upward direction as a positive direction. The negative direction on the z-axis generally coincides with the direction of gravity force. The rotation angle about the x-axis is expressed by Rx, the rotation angle about the y-axis is expressed by Ry, and the rotation angle about the z-axis is expressed by Rz. An arbitrary position in the three-dimensional space may be expressed by coordinates on the x, y, z-axes and an arbitrary posture in the three-dimensional space may be expressed by the rotation angles Rx, Ry, Rz. The positions and postures of the end effector 20, the manipulator 10, the base 11, etc. may be defined in the world coordinate system. Hereinafter, "position" may refer to a pose, i.e., position and posture. Similarly, hereinafter, "force" may refer to load, i.e., force and torque. The control apparatus 40 controls the position of the TCP in the world coordinate system by driving the manipulator 10.

The handler 50 is a belt conveyer having e.g. a belt that functions as the path 51 and transport rollers 50a, 50b that feed the belt. The handler 50 is not limited to the belt conveyer, but may be any apparatus that transports the object W along a predetermined path. The object W may be any object on which work can be performed by the robot 1 using the end effector 20 including e.g. industrial products such as printers and automobiles and components thereof.

In the example shown in FIG. 1, the transport surface forming the surface of the belt of the handler 50 is parallel to the x-y plane in the world coordinate system, and the positive direction of the y-axis coincides with the path direction 52. The handler 50 moves the transport surface by the transport rollers 50a, 50b in the path direction 52, and thereby, transports the object W in the path direction 52. For example, the transport roller 50a includes a transport amount sensor (not shown) that outputs a signal according to the rotation amount to the control apparatus 40. The transport surface of the handler 50 moves without slipping relative to the rotation of the transport roller 50a, and the output of the transport amount sensor indicates the transport amount of the object W by the handler 50. The transport amount of the object W refers to an amount of movement per unit time of the transported object W.

The position sensor 30 detects the position of the object W from above the handler 50. The position sensor 30 is e.g. a camera that outputs an image of the object W to the control apparatus 40. Or, a laser range scanner or the like may be employed as the position sensor 30. For example, the position sensor 30 is supported by a supporting member (not shown) above the handler 50. As shown by broken lines in FIG. 1, the position sensor 30 has an angle of view containing the object W transported along the path 51. A position in the image output from the position sensor 30 is associated with a position in the path 51 of the handler 50 by the control apparatus 40. Therefore, when the object W exists within the angle of view of the position sensor 30, the coordinates of the object W on the x-y plane can be specified based on the position of the object W in the image of the position sensor 30.

Figure 2:
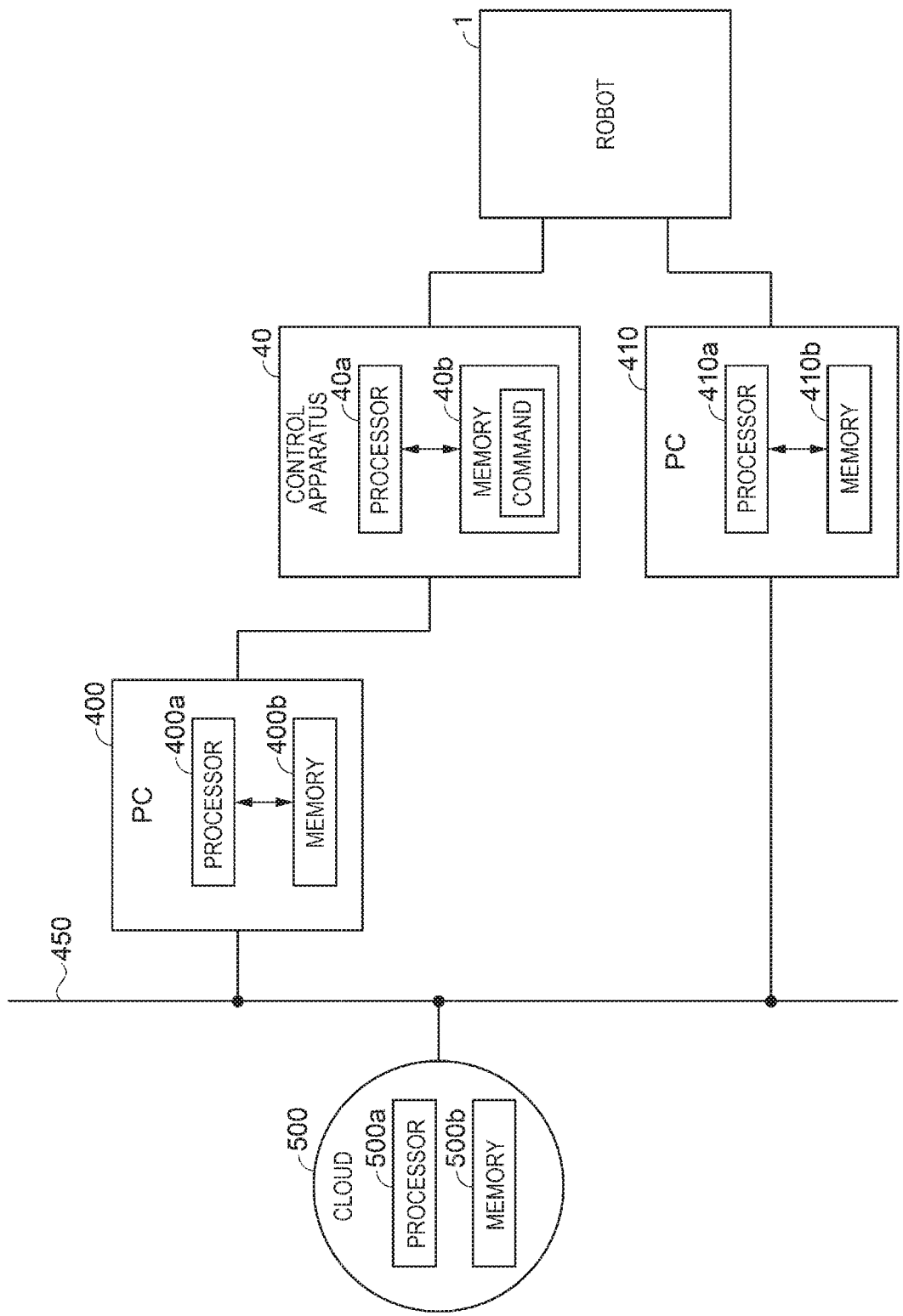
FIG. 2 is a block diagram for explanation of an example of a control apparatus having a plurality of processors.

As shown in FIG. 2, the control apparatus 40 includes a processor 40a and a memory 40b forming a computer system. The control apparatus 40 can be formed by e.g. a general-purpose computer. The processor 40a controls the robot 1 by execution of a command according to a control program. The processor 40a is a processing circuit such as e.g. a central processing unit (CPU). The memory 40b is a computer-readable storage medium that stores programs and various kinds of data necessary for the control of the robot 1. The memory 40b is e.g. a random access memory (RAM), read only memory (ROM), or the like. Part or all of the component elements of the control apparatus 40 may be placed inside of the housing of the robot 1.

As shown in FIG. 1, the control apparatus 40 respectively communicates with the robot 1 and the teaching apparatus 45 via communication links. The communication links may be wired or wireless or a combination of wired and wireless connection. The control apparatus 40 may control driving of the end effector 20, the position sensor 30, and the handler 50. For example, when the end effector 20 is a screw driver, the control apparatus 40 may perform screwing by driving the end effector 20. The control apparatus 40 may transport the object W by driving the transport rollers 50a, 50b. Further, the control apparatus 40 acquires the transport amount of the object W transported by the handler 50 based on the output of the transport amount sensor of the handler 50.

The control apparatus 40 may include a plurality of processors. That is, in the example shown in FIG. 2, the control apparatus 40 can configure a control apparatus that controls the robot 1 with personal computers (PCs) 400, 410 coupled to the control apparatus 40 via a network 450 and a cloud 500 as a service server. The PC 400 includes a processor 400a and a memory 400b and the PC 410 includes a processor 410a and a memory 410b. The cloud 500 includes a processor 500a and a memory 500b. The control apparatus 40 may realize a control apparatus that controls the robot 1 using hardware resources of the other devices including the processors 400a, 410a, 500a and the memories 400b, 410b, 500b.

The teaching apparatus 45 is a computer that teaches programs to the robot 1 via the control apparatus 40. The teaching apparatus 45 may be a dedicated computer such as a teaching pendant or a general-purpose computer in which programs for teaching the robot 1 are installed. The teaching apparatus 45 may include a housing separate from the control apparatus 40 or share the housing with the control apparatus 40.

In the embodiment, a case where screwing to insert a screw into a screw hole H formed in the object W by the end effector 20 as a screw driver is performed as work is explained as an appropriate example.

Figure 3:
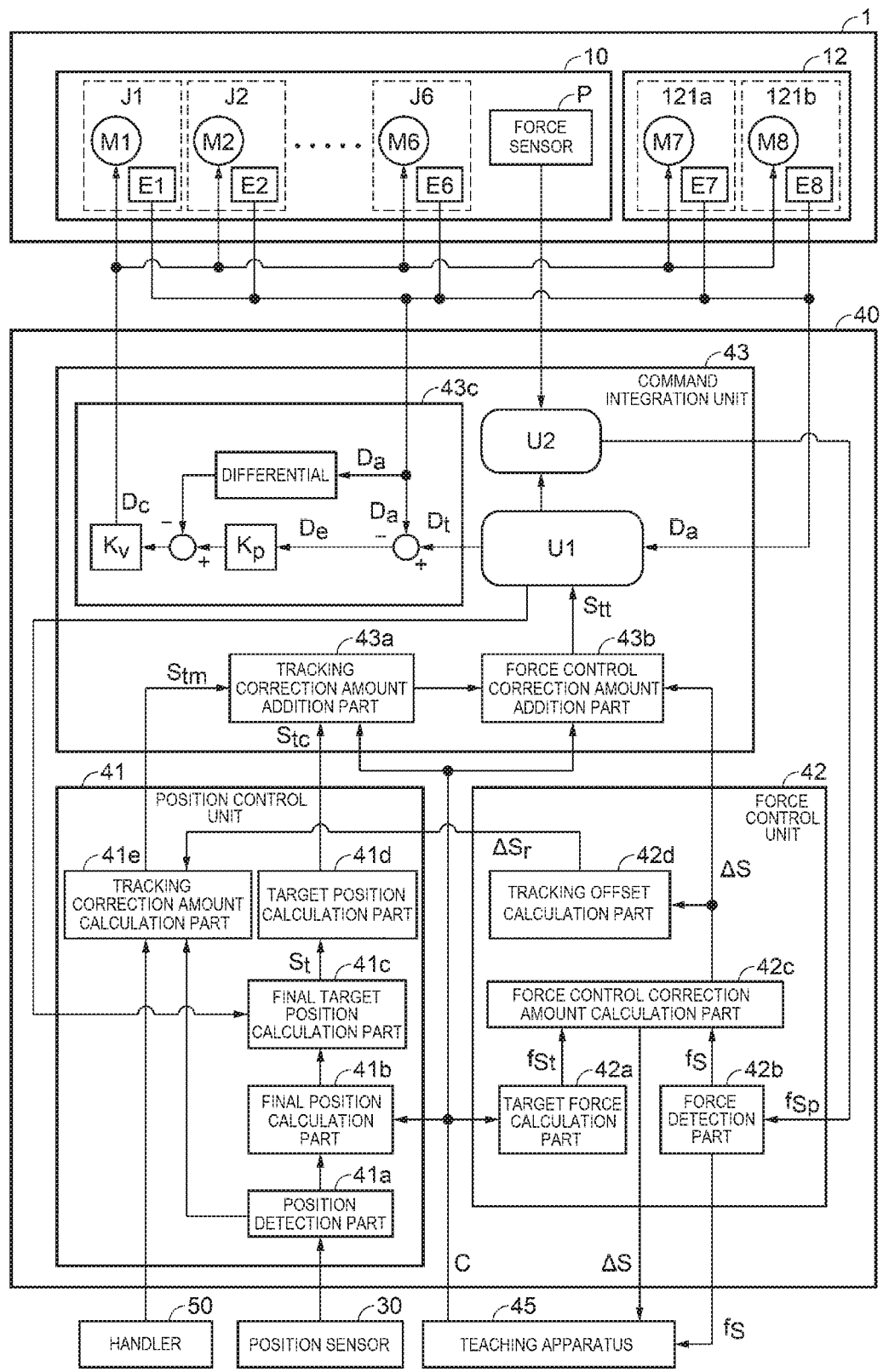
FIG. 3 is a functional block diagram for explanation of the control apparatus.

As shown in FIG. 3, the joints J1 to J6 of the manipulator 10 have motors M1 to M6 as actuators and encoders E1 to E6 as angle sensors, respectively. The motors M1 to M6 are respectively driven under the control by the control apparatus 40 and rotate the joints J1 to J6, respectively. The encoders E1 to E6 detect the rotation angles of the motors M1 to M6 and output the angles to the control apparatus 40.

The pair of driving wheels 121 of the moving unit include two driving wheels 121a, 121b. The driving wheels 121a, 121b include motors M7, M8 as actuators and encoders E7, E8 as angle sensors, respectively. The motors M7, M8 are respectively driven under the control by the control apparatus 40 and rotate the driving wheels 121a, 121b, respectively. The encoders E7, E8 detect the rotation angles of the motors M7, M8 and output the angles to the control apparatus 40.

As shown in FIG. 3, the control apparatus 40 has a position control unit 41, a force control unit 42, and a command integration unit 43 as a logical structure. The position control unit 41, the force control unit 42, and the command integration unit 43 are realized by the control apparatus 40 executing a preinstalled control program. The position control unit 41, the force control unit 42, and the command integration unit 43 may be respectively formed by pluralities of processing circuits or formed by an integrated processing circuit to one another.

The control apparatus 40 has a first conversion unit U1 that bi-directionally converts between a combination of the respective rotation angles of the motors M1 to M8 and a position of the TCP in the world coordinate system based on a prestored correspondence relationship. For example, the first conversion unit U1 converts a position S in the world coordinate system into respective rotation angles Da of the motors M1 to M8. The position S may represent a position and a posture on the six axes (x, y, z, Rx, Ry, Rz) defining the world coordinate system. The control signals output by the control apparatus 40 to the motors M1 to M8 are e.g. pulse-width modulated (PWM) signals.

The control apparatus 40 has a second conversion unit U2 that converts a force measured by the force sensor P into a force $f_{Sp}$ in the world coordinate system based on the correspondence relationship showing the posture of the sensor coordinate system with respect to each position S of the TCP in the world coordinate system. The second conversion unit U2 calculates a torque component of the force $f_{Sp}$ from a force component of the force $f_{Sp}$ and a distance from a contact point between the end effector 20 and the object W to the force sensor P.

The position control unit 41 has a position detection part 41a, a final position calculation part 41b, a final target position calculation part 41c, a target position calculation part 41d, and a tracking correction amount calculation part 41e as a logical structure. The position control unit 41 has a function of controlling the end effector 20 to follow the transported object W. The position of the transported object W may be acquired using various methods in the position control unit 41. As below, a method of detecting the position of the object W using an image acquired from the position sensor 30 as an image sensor or the like will be exemplarily explained.

The position detection part 41a acquires the position of the object W using the position sensor 30. The position detection part 41a detects the position of the object W in the world coordinate system from the position of the object W in the image input from the position sensor 30. The position detection part 41a detects x, y coordinates of the screw hole H of the object W based on information representing the height of the path 51 of the handler 50 and the shape of the object W stored in the control apparatus 40. The position detection part 41a may detect the position of the object W by template matching and teaching by the teaching apparatus 45.

The final position calculation part 41b calculates the final position of the TCP at completion of the work based on the position of the object W detected by the position detection part 41a and a command C created using the teaching apparatus 45. For example, the final position calculation part 41b calculates the final position of the TCP at completion of the work of moving the tip of the screw to the first position offset by a predetermined distance in the positive direction of the z-axis from the screw hole H for screwing. Further, the final position calculation part 41b calculates the final position of the TCP at completion of screwing of moving the screw to a position shifted by a distance of movement of the screw in the negative direction of the z-axis from the first position. The final position is a position with reference to the object W. Note that the initial position and the final position may be defined in the world coordinate system.

The final target position calculation part 41c calculates a final target position $S_t$ from the final position of the TCP calculated by the final position calculation part 41b and target position offset $S_{to}$. Specifically, the final target position calculation part 41c calculates a first final target position indicating the position of the moving unit 12 and a second final target position indicating the position of the manipulator 10 when the TCP is located in the final position as the final target position $S_t$. The final target position $S_t$ may be defined in the world coordinate system. The target position offset $S_{to}$ is an amount for offset of the position of the moving unit 12 calculated by e.g. the same work at the previous time.

The target position calculation part 41d calculates a target position $S_{tc}$ with respect to each micro time as a control command for moving the TCP to the final target position $S_t$. That is, the target position calculation part 41d calculates the target position $S_{tc}$ of the TCP with respect to each micro time in a movement time from the detection time at which the position of the object W is detected by the position detection part 41a to an arrival time at which the TCP arrives at the final target position $S_t$. Specifically, the target position calculation part 41d calculates a first target position indicating the position of the moving unit 12 with respect to each micro time and a second target position indicating the position of the manipulator 10 with respect to each micro time as the target position $S_{tc}$. The target position calculation part 41d calculates the target position $S_{tc}$ with respect to each micro time in the movement time as a trajectory of the TCP in the movement time. As described above, the final position calculation part 41b, the final target position calculation part 41c, and the target position calculation part 41d calculate the target position $S_{tc}$ of the end effector 20 based on the position of the object W detected by the position detection part 41a.

For example, when the micro time is ΔT, the detection time is T, and the arrival time is $T_f$, the target position calculation part 41d calculates the target positions $S_{tc}$ of the TCP at the respective times of T1, T+ΔT, T+2ΔT, . . . , $T_f$–ΔT, $I_f$. The target position calculation part 41d outputs the target position $S_{tc}$ at the next time at each time with respect to each micro time to the command integration unit 43. The target position $S_{tc}$ is a position calculated relative to the object W, and required to be corrected based on the transport amount of the handler 50 for use as a target value in position control of the TCP.

The tracking correction amount calculation part 41e calculates a tracking correction amount $S_{tm}$ for correction of the target position $S_{tc}$ based on the transport amount of the object W by the handler 50. Specifically, the tracking correction amount calculation part 41e calculates the transport amount of the object W with respect to each micro time based on the output of the transport amount sensor of the handler 50, and thereby, calculates the tracking correction amount $S_{tm}$ with respect to each micro time. Accordingly, the tracking correction amount calculation part 41e stores the information representing the path 51 of the handler 50 in advance. The tracking correction amount $S_{tm}$ is an amount for correction of the target position $S_{tc}$ so that the end effector 20 may follow the object W in correspondence with the transport amount. The tracking correction amount calculation part 41e calculates the tracking correction amount $S_{tm}$ in synchronization with the target position $S_{tc}$ and outputs the amount to the command integration unit 43.

The force control unit 42 has a target force calculation part 42a, a force detection part 42b, a force control correction amount calculation part 42c, and a tracking offset calculation part 42d as a logical structure. The force control unit 42 has a function of controlling an acting force $f_S$ acting on the object W from the end effector 20 to be a predetermined target force $f_{St}$. Specifically, the force control unit 42 calculates a force control correction amount ΔS for correction of the target position $S_{tc}$ to set the acting force $f_S$ to the target force $f_{St}$, and outputs the amount to the command integration unit 43.

The target force calculation part 42a calculates the target force $f_{St}$ based on the command C stored by the control apparatus 40 according to the teaching by the teaching apparatus 45. The command C shows the target force $f_{St}$ that should act on the object W in the work performed by the robot 1. For example, when a screw suctioned to the tip of the screw driver is pressed against the object W by a predetermine force, the target force calculation part 42a calculates the target force $f_{St}$ as the predetermined force. In the case of screwing shown in FIG. 1, the target force calculation part 42a calculates the target force $f_{St}$ for execution of profile control to set the force in the negative direction of the z-axis to a predetermined value and the force along the x-y plane to zero. The target force $f_{St}$ is a value for controlling the force acting on the object W to be a desired value.

The force detection part 42b acquires the acting force $f_S$ acting on the end effector 20 from the object W using the force sensor P. Specifically, the force detection part 42b detects the acting force $f_S$ acting on the end effector 20 without an influence of gravity force by providing gravity compensation to remove the component due to the gravity force to the force $f_{Sp}$ acquired from the force sensor P via the second conversion unit U2.

The force control correction amount calculation part 42c calculates the force control correction amount ΔS for correction of the target position $S_{tc}$ to set the acting force $f_S$ to the target force $f_{St}$ from the target force $f_{St}$ and the acting force $f_S$. The force control correction amount ΔS refers to an amount in which the TCP should move from the position S to resolve a force deviation $\Delta f_{S(t)}$ of the acting force $f_S$ from the target force $f_{St}$ when the TCP is subjected to mechanical impedance. The force control correction amount calculation part 42c calculates the force control correction amount ΔS by e.g. active impedance control that realizes virtual mechanical impedance using the motors M1 to M8. The force control unit 42 applies impedance control in a process in which the end effector 20 contacts the object W. For example, the force control correction amount calculation part 42c calculates the force control correction amount ΔS by substitution of the target force $f_{St}$ and the acting force $f_S$ in the equation of motion of the impedance control as expressed in Equation (1).

$$m\Delta \ddot{S}(t) + d\Delta \dot{S}(t) + k\Delta S(s) = \Delta f_S(t) \tag{1}$$

The left side of Equation (1) is the sum of the first term in which the second-order differential value of the position S of the TCP is multiplied by a virtual inertial parameter m, the second term in which the differential value of the position S of the TCP is multiplied by a virtual viscosity parameter d, and the third term in which the position S of the TCP is multiplied by a virtual elastic parameter k. The right side of Equation (1) is the force deviation $\Delta f_S(t)$ obtained by subtraction of the acting force $f_S$ from the target force $f_{St}$.

The differential in Equation (1) is time differential. In a process of work performed by the robot 1, a constant value may be set as the target force $f_{St}$ or a time function may be set as the target force $f_{St}$. The virtual inertial parameter m refers to a mass that the TCP virtually has. The virtual viscosity parameter d refers to a viscous resistance to which the TCP is virtually subjected, and the virtual elastic parameter k refers to a spring constant to which the TCP is virtually subjected.

The tracking offset calculation part 42d calculates tracking offset $\Delta S_r$ for correction of the tracking correction amount $S_{tm}$ from the force control correction amount $\Delta S$ calculated by the force control correction amount calculation part 42c. The tracking offset $\Delta S_r$ is a statistic as a representative of a plurality of force control correction amounts $\Delta S$ calculated according to e.g. the history of the force control correction amount $\Delta S$. The tracking offset calculation part 42d stores the force control correction amounts $\Delta S$ calculated at the respective times and calculates the statistic of average values, mean values, etc. of the plurality of force control correction amounts $\Delta S$ as the tracking offset $\Delta S_r$. Or, the tracking offset calculation part 42d may calculate a mode corresponding to the peak of the distribution of the force control correction amounts $\Delta S$ as the tracking offset $\Delta S_r$ when the dispersion or standard deviation of the force control correction amounts $\Delta S$ falls within a predetermined range.

In the force control in the robot system 100, the control apparatus 40 controls the acting force $f_S$ to be the target force $f_{St}$ by driving at least the manipulator 10 based on the force control correction amount $\Delta S$. When the same work is executed on the same object W at a plurality of times, the force control correction amount $\Delta S$ may be reproduced. The tracking offset $\Delta S_r$ according to the force control correction amount $\Delta S$ is added to the tracking correction amount $S_{tm}$ for position control to control the end effector 20 to follow the object W, and thereby, necessary correction in the force control can be realized by position control. Therefore, the control in the same work may be simpler and the cycle time of the work may be shortened.

The command integration unit 43 has a tracking correction amount addition part 43a, a force control correction amount addition part 43b, and a feedback control part 43c as a logical structure. The command integration unit 43 integrates the target position $S_{tc}$ and the tracking correction amount $S_{tm}$ as control commands calculated by the position control unit 41 and the force control correction amount $\Delta S$ as a control command calculated by the force control unit 42. The command integration unit 43 outputs an operation amount to the robot 1 to achieve a target value according to the integrated control command.

The tracking correction amount addition part 43a adds the tracking correction amount $S_{tm}$ to the target position $S_{tc}$. That is, the tracking correction amount addition part 43a corrects the target position $S_{tc}$ using the tracking correction amount $S_{tm}$. The tracking correction amount addition part 43a outputs the target position $S_{tc}$ corrected by the tracking correction amount $S_{tm}$ to the force control correction amount addition part 43b. Specifically, the tracking correction amount addition part 43a calculates a first tracking correction amount applied to the moving unit 12 and a second tracking correction amount applied to the manipulator 10 from the tracking correction amount $S_{tm}$. The tracking correction amount addition part 43a outputs the first target position corrected using the first tracking correction amount and the second target position corrected using the second tracking correction amount to the force control correction amount addition part 43b.

For example, when the target position $S_{tc}$ is out of a first range with reference to the base 11, the tracking correction amount addition part 43a sets the tracking correction amount $S_{tm}$ as the first tracking correction amount and the second tracking correction amount to zero. For example, the first range is defined in the base coordinate system set for the base 11. The first range is e.g. the movable range of the end effector 20, i.e., a range in which the position of the TCP that changes by driving of the manipulator 10 may be located. The tracking correction amount addition part 43a may set the first tracking correction amount to the tracking correction amount $S_{tm}$ when the tracking correction amount $S_{tm}$ is equal to or larger than a first threshold value. The first threshold value is e.g. a value at which the target position $S_{tc}$ corrected by the tracking correction amount $S_{tm}$ exceeding the first threshold value is expected to be out of the first range. The first tracking correction amount is set to the tracking correction amount $S_{tm}$, and thereby, the control apparatus 40 drives the manipulator 10 based on the target position $S_{tc}$ and drives the moving unit 12 based on the tracking correction amount $S_{tm}$. Thereby, the control apparatus 40 controls the end effector 20 to follow the object W transported by the handler 50.

The force control correction amount addition part 43b adds the force control correction amount $\Delta S$ to the target position $S_{tc}$ corrected by the tracking correction amount $S_{tm}$. That is, the force control correction amount addition part 43b further corrects the target position $S_{tc}$ corrected by the tracking correction amount $S_{tm}$ using the force control correction amount $\Delta S$. Specifically, the force control correction amount addition part 43b calculates the first tracking correction amount applied to the moving unit 12 and the second tracking correction amount applied to the manipulator 10 from the force control correction amount $\Delta S$. The force control correction amount addition part 43b calculates a first commanded position from the first target position corrected using the first tracking correction amount and the first force control correction amount. Similarly, the force control correction amount addition part 43b calculates a second commanded position from the second target position corrected using the second tracking correction amount and the second force control correction amount. In this manner, the force control correction amount addition part 43b calculates a commanded position $S_{tt}$ including the first commanded position applied to the motors M7, M8 of the moving unit 12 and the second commanded position applied to the motors M1 to M6 of the manipulator 10. The commanded position $S_{tt}$ refers to a final target value of the TCP in the world coordinate system.

For example, when the target position $S_{tc}$ is out of a second range with reference to the base 11, the force control correction amount addition part 43b sets a component of the force control correction amount $\Delta S$ in the path direction 52 as the first force control correction amount and sets another than the component of the force control correction amount $\Delta S$ in the path direction 52 as the second force control correction amount. The second range is e.g. the same range as the first range. When the component of the force control correction amount $\Delta S$ in the path direction 52 is equal to or larger than a second threshold value, the force control correction amount addition part 43b may set the first force control correction amount to the component of the force control correction amount $\Delta S$ in the path direction 52. As described above, when the force control correction amount ΔS is used for correction of the target position $S_{tc}$ in the path direction 52, the control apparatus 40 may drive the moving unit 12 based on the component of the force control correction amount ΔS in the path direction 52 and drive the manipulator 10 based on the other than the component of the force control correction amount ΔS in the path direction 52.

The first conversion unit U1 converts the commanded position $S_{tt}$ in the world coordinate system into target angles $D_t$ as target values of the respective rotation angles of the motors M1 to M8. Of the commanded position $S_{tt}$, the first commanded position is applied to the motors M7, M8 of the moving unit 12 and the second commanded position is applied to the motors M1 to M6 of the manipulator 10.

The feedback control part 43c performs feedback control to control the rotation angles to be the target angles $D_t$ using real rotation angles $D_a$ of the motors M1 to M8 as control amounts. The feedback control part 43c first calculates deviations $D_e$ by subtraction of the rotation angles $D_a$ from the target angles $D_t$. The feedback control part 43c acquires the rotation angles $D_a$ from output of the encoders E1 to E8. The feedback control part 43c calculates drive speed deviations as differences between values obtained by multiplication of the deviations $D_e$ by position control gain $K_p$ and values obtained by time differential of the rotation angles $D_a$. The feedback control part 43c calculates operation amounts $D_c$ by multiplication of the drive speed deviations by speed control gain $K_v$. The position control gain $K_p$ and the speed control gain $K_v$ may include control gain with respect not only to the proportion component but also the differential component and the integral component. The operation amounts $D_c$ are specified with respect to each of the motors M1 to M8.

The control apparatus 40 controls the robot 1 in one control mode of a position control mode, a force control mode, a position and force control mode or a control mode in which these modes are sequentially changed. The control apparatus 40 may autonomously change the above described modes based on the output of the force sensor P, the encoders E1 to E8, etc. or according to a command. In the example shown in FIG. 1, when screwing work is performed, the force control mode is used for profile control to set target forces of an x-axis component and a y-axis component to zero. Regarding a z-axis component, the position and force control mode is used for pressing the end effector 20 against the object W via a screw with a target force not zero. In this case, the position control mode may be used for Rx, Ry, Rz components.

The force control mode is a mode for controlling the motors M1 to M8 at rotation angles derived from the target force $f_{St}$ based on the equation of motion. In the force control mode, when the target positions $S_{tc}$ at the respective times do not change over time during work, feedback control on the target force $f_{St}$ is executed. For example, during work of screwing, fitting, or the like, when the target position $S_{tc}$ reaches a work completion position, the target position $S_{tc}$ does not subsequently change over time and the work is executed in the force control mode. The control apparatus 40 can also perform feedback control using the tracking correction amount $S_{tm}$ according to the transport amount of the object W in the force control mode.

The position control mode is a mode for controlling the motors M1 to M8 at rotation angles derived by linear operation from the target position $S_{tc}$. In the position control mode, when force control is not necessary during work, feedback control on the target position $S_{tc}$ is executed. In other words, the position control mode is a mode in which the force control correction amount ΔS by the force control is constantly zero. The control apparatus 40 can also perform feedback control using the tracking correction amount $S_{tm}$ according to the transport amount of the object W in the position control mode.

The position and force control mode is a mode for controlling the motors M1 to M8 by integration of the rotation angles derived by linear operation from the target position $S_{tc}$ and the rotation angles derived from the target force $f_{St}$ based on the equation of motion by linear combination and using the integrated rotation angles. In the position and force control mode, during work, when the target positions $S_{tc}$ at the respective times change over time, feedback control on the force control correction amount ΔS according to the target position $S_{tc}$ and the target force $f_{St}$ is executed. For example, in work including grinding work and deburring work, when the work position with respect to the object W is not a single point, but has a length or area and changes over time, the work is executed in the position and force control mode. The control apparatus 40 can also perform feedback control using the tracking correction amount $S_{tm}$ according to the transport amount of the object W in the position and force control mode.

According to the above described configuration, the control apparatus 40 controls the end effector 20 to follow the object W transported by the handler 50 by driving the moving unit 12 and the manipulator 10. Thereby, the control apparatus 40 may control the robot 1 to perform work on the object W using the end effector 20. Further, according to the robot system 100, during work, the moving unit 12 moves the base 11 in the path direction 52, and the time in which the work by the robot 1 can be performed may be made longer. That is, the possibility that the object W is out of the movable range of the end effector 20 before the work on the object W is completed may be reduced.

Furthermore, when there is an interaction due to contact between the end effector 20 and the object W during work, the control apparatus 40 controls the acting force $f_S$ to be the target force $f_{St}$. Here, the target force $f_{St}$ is a force necessary for work on the object W, and thus, the robot 1 may perform work without interference with the transport of the object W. Therefore, the robot system 100 can perform work on the object W without stopping the handler 50 or withdrawing the object W from the handler 50. A work space for withdrawing is unnecessary.

The robot system 100 performs the force control in addition to the position control, and thus, influences by various kinds of errors in work may be reduced. For example, the transport amount of the object W acquired by the transport amount sensor of the handler 50 may contain an error. Further, the position of the object W specified from the surface of the path 51 of the handler 50 and the image of the position sensor 30 may also contain an error. Furthermore, when work is performed on a plurality of objects W, the individual objects W may contain errors with respect to design. Deformation due to wear or the like may occur in the end effector 20 including a screw driver and grinding tool. Therefore, when the end effector 20 is controlled to follow the object W only by the position control, it is difficult to continue to properly execute work on each of the plurality of objects W. However, according to the force control, even when the relationship between the position of the TCP and the target position $S_{tc}$ shifts from an ideal relationship, the acting force $f_S$ may be controlled to be the target force $f_{St}$ while the end effector 20 contacts the object W. Accordingly, the robot system 100 may perform work with reduced influences by various kinds of errors.

Note that a user may teach the final target position $S_t$ and the target force $f_{St}$ in each work to the control apparatus 40 using the teaching apparatus 45. That is, in the teaching apparatus 45, the above described commands according to teaching are generated. The teaching by the teaching apparatus 45 may be performed in various modes. For example, the final target position $S_t$ may be designated by the user moving the robot 1 with a hand or the final target position $S_t$ in the world coordinate system may be designated in the teaching apparatus 45.

Figures 4, 5:
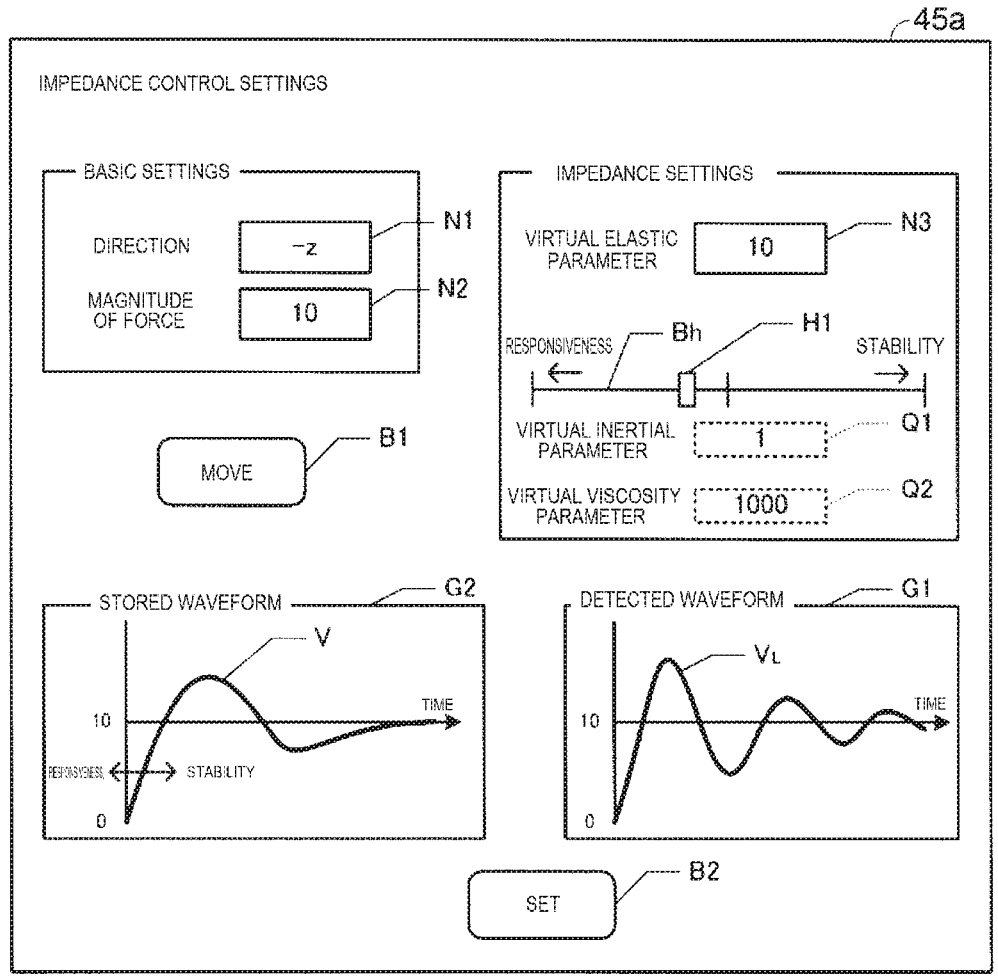
FIG. 4 is a diagram for explanation of an example of GUI of a teaching apparatus.
FIG. 5 is a table for explanation of examples of commands.

For example, as shown in FIG. 4, a display device of the teaching apparatus 45 displays a window 45a that functions as a graphical user interface (GUI). The user may teach various variables relating to the control of the robot 1 including the target force $f_{St}$ to the control apparatus 40 using the GUI of the teaching apparatus 45. The teaching apparatus 45 can teach the virtual inertial parameter m, the virtual viscosity parameter d, and the virtual elastic parameter k with the target force $f_{St}$ by the GUI. Various variable values relating to the control of the robot 1 may be input to the teaching apparatus 45 via the GUI according to operations by the user on an input device (not shown). As the input device, various switches, a keyboard, a pointing device including a touch panel or the like can be employed. For example, the GUI is displayed when the TCP is moved to the start position of work using the force control by the target force $f_{St}$ and a real object W is placed. In the example shown in FIG. 4, the window 45a contains entry windows N1 to N3, a slider bar Bh, display windows Q1, Q2, graphs G1, G2, and buttons B1, B2.

In the teaching apparatus 45, the direction and the magnitude of the target force $f_{St}$ may be designated using the entry windows N1, N2. In the teaching apparatus 45, in the entry window N1, the direction of the axis defining the world coordinate system or base coordinate system is designated. The direction designated in the base coordinate system is converted into a direction in the world coordinate system in the teaching apparatus 45 or control apparatus 40. In the teaching apparatus 45, in the entry window N2, the magnitude of the target force $f_{St}$ is designated.

Further, in the teaching apparatus 45, the virtual elastic parameter k may be designated in the entry window N3. When the virtual elastic parameter k is designated, the teaching apparatus 45 displays a stored waveform V corresponding to the virtual elastic parameter k in the graph G2. The horizontal axis of the graph G2 indicates time and the vertical axis of the graph G2 indicates the acting force. The stored waveform V is a time-response waveform of the acting force and stored with respect to each virtual elastic parameter k in the memory medium of the teaching apparatus 45 in advance. The stored waveform V converges to a value designated in the entry window N2. When the manipulator 10 is driven so that the force having the magnitude designated in the window N2 may act on the TCP under a general condition, the stored waveform V shows time-response characteristics of the acting force acquired from the force sensor P. When the virtual elastic parameter k is different, the shape of the stored waveform V is largely different, and thus, the stored waveform V is stored with respect to each virtual elastic parameter k.

In the teaching apparatus 45, the virtual viscosity parameter d and the virtual inertial parameter m are designated according to an operation on a slider H1 of the slider bar Bh by the user. In the GUI, the slider bar Bh and the slider H1 are displayed for designation of the virtual inertial parameter m and the virtual viscosity parameter d. For example, the more rightward the slider H1, the higher the stability, and the more leftward the slider H1, the higher the responsiveness. In the teaching apparatus 45, the virtual inertial parameter m and the virtual viscosity parameter d are designated by the position of the slider H1. The teaching apparatus 45 makes an adjustment so that a ratio between the virtual inertial parameter m and the virtual viscosity parameter d may be constant, e.g. m:d=1:1000. The teaching apparatus 45 displays the virtual inertial parameter m and the virtual viscosity parameter d in the display window Q1 and the display window Q2, respectively.

The teaching apparatus 45 controls the manipulator 10 at the current set values according to an operation on the button B1 by the user. The teaching apparatus 45 gives a command to the control apparatus 40 to drive the manipulator 10 based on the target force $f_{St}$ and the respective parameters m, d, k of impedance control set in the GUI. The control apparatus 40 displays a detected waveform VL of the force acting on the TCP in the graph G1 based on the output of the force sensor P. The user may adjust the target force $f_{St}$ and the parameters m, d, k of the impedance control by comparing the stored waveform V and the detected waveform VL.

The teaching apparatus 45 generates a control program described using commands with the final target position $S_t$, the target force $f_{St}$, and the parameters m, d, k of the impedance control as arguments and outputs the program to the control apparatus 40. When the control program is loaded into the control apparatus 40, the control apparatus 40 may execute control of the robot 1 using the designated parameters.

The control program is described by a predetermined program language and converted into a machine language program via an intermediate language by a translation program. The processor 40a executes the machine language program in a clock cycle. The translation program may be executed in the teaching apparatus 45 or control apparatus 40. The command of the control program is formed by a main body and an argument. The commands include action control commands for operating the moving unit 12, the manipulator 10, and the end effector 20, monitor commands for reading output of the sensors etc., and setting commands for setting various kinds of variables. The execution of the commands refers to execution of the machine language program with the translated commands.

As shown in FIG. 5, the types of the action control commands include a force control corresponding command that enables driving of the robot 1 in the force control mode and a position control command that disables driving of the robot 1 in the force control mode. The force control corresponding command designates ON of the force control mode by the argument. When ON of the force control mode is not designated by the argument, the force control corresponding command is executed in the position control mode. When ON of the force control mode is designated by the argument, the force control corresponding command is executed in the force control mode. In the force control mode, the execution of the force control corresponding command is enabled and the execution of the position control command is disabled. Syntax error check by the translation program is executed so that the position control command may not be executed in the force control mode.

In the force control corresponding command, continuation of the force control mode may be designated by the argument. In the force control corresponding command executed in the force control mode, when the continuation of the force control mode is designated by the argument, force control mode is continued. On the other hand, when the continuation of the force control mode is not designated by the argument, the force control mode ends until the execution of the force control corresponding command is completed. If the force control corresponding command is executed in the force control mode, unless the continuation is designated by the argument, the force control mode autonomously ends according to the force control corresponding command and the force control command does not continue after the execution of the force control corresponding command ends. In FIG. 5, "CP (Continuous Path)" refers to a group of commands that enable designation of movement directions, "PTP (Pose to Pose)" refers to a group of commands that enable designation of target positions, and "CP+PTP" refers to a group of commands that enable designation of movement directions and target positions.

When the position of the object W is acquired in the position detection part 41a, the control apparatus 40 acquires the final target position $S_t$ according to the command by the teaching apparatus 45. That is, in the example shown in FIG. 1, the control apparatus 40 stores information representing the height of the path 51 of the handler 50 and the position of the screw hole H in the object W in advance. The control apparatus 40 calculates the target position $S_{tc}$ with respect to each micro time ΔT based on the final target position $S_t$.

Figure 6:
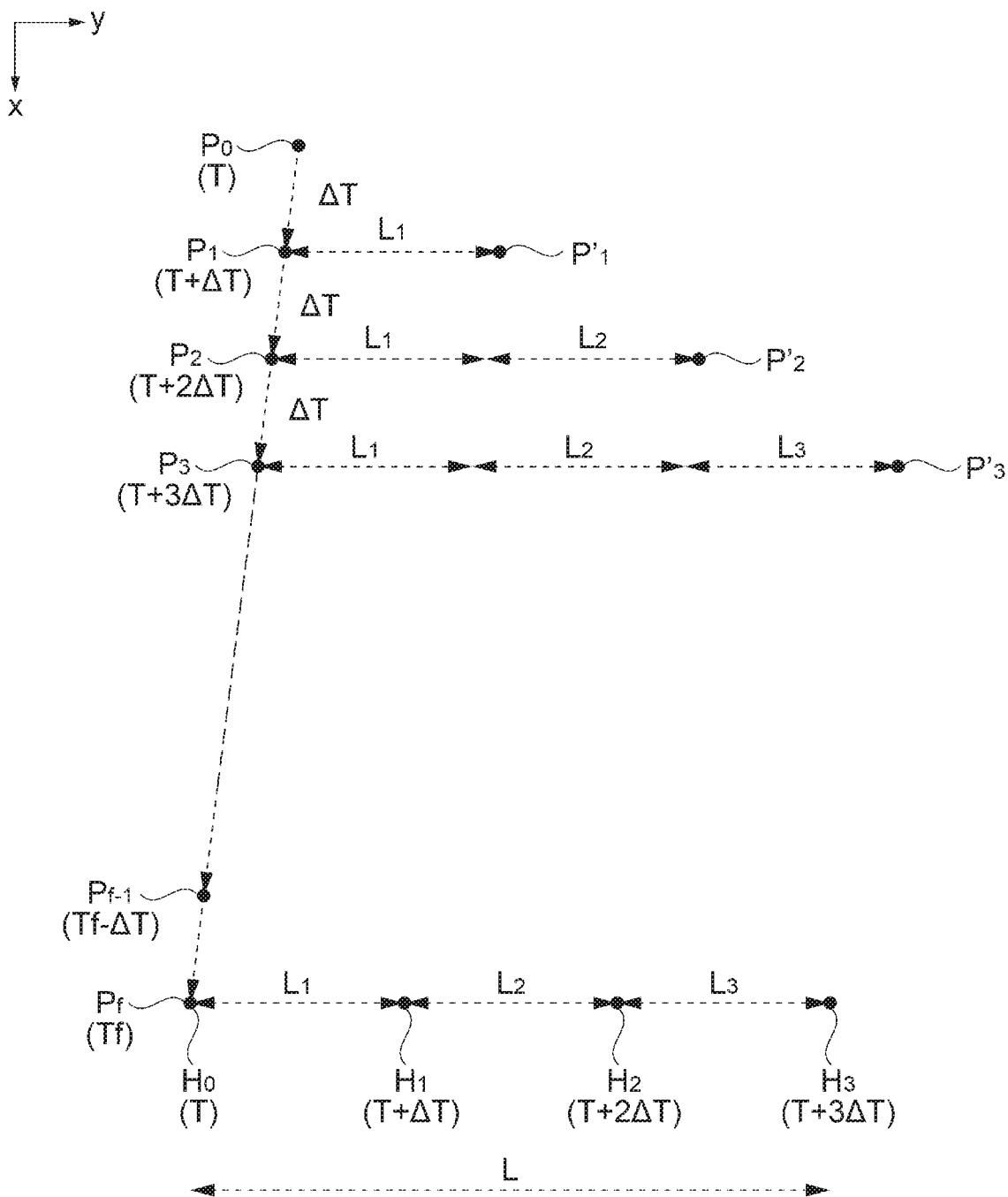
FIG. 6 is a diagram for explanation of relationships between positions of screw holes and TCP.

For example, as shown in FIG. 6, the position detection part 41a detects a position $H_0$ of the screw hole H as a work point of the object W at time T. The screw hole H sequentially moves to positions H1, H2, H3 at times T+ΔT, T+2ΔT, T+3ΔT. Concurrently, the control apparatus 40 detects a position $P_0$ of the TCP at time T. As below, for simplicity of explanation, an example in which the x-y coordinates of the final target position $S_t$ of the TCP coincide with those of the screw hole H will be explained. The target position calculation part 41d divides a period from time T to time $T_f$ at which the TCP reaches the screw hole H into micro times ΔT and calculates the target position $S_{tc}$ at each time. The target position calculation part 41d calculates positions $P_1$, $P_2$, $P_3$, ..., $P_{f-1}$, $P_f$ as the respective target positions $S_{tc}$ at the times T+ΔT, T+2ΔT, T+3ΔT, ..., $T_f$-ΔT, $T_f$.

The tracking correction amount calculation part 41e calculates the transport amount of the object W from the time T to the present based on the output of the transport amount sensor of the handler 50. The tracking correction amount calculation part 41e calculates movement amounts L of the object W estimated in which the object moves from the present to the micro time ΔT as the tracking correction amounts $S_{tm}$ at the respective times based on the transport amount of the object W. For example, when the current time is time T+2ΔT, the tracking correction amount calculation part 41e acquires the movement amount L of the object W at time T+3ΔT as the tracking correction amount $S_{tm}$. The tracking correction amount calculation part 41e calculates the movement amount L by estimating a movement amount L3 at the next micro time ΔT from a movement amount L1+L2 from time T to time T+2ΔT and adding the movement amount L3 to the movement amount L1+L2.

The command integration unit 43 calculates the commanded position $S_{tt}$ by further correcting the target position $S_{tc}$ corrected by the tracking correction amount $S_{tm}$ using the force control correction amounts ΔS at the respective times. The command integration unit 43 drives the moving unit 12 and the manipulator 10 by outputting the operation amounts $D_m$ based on the commanded position $S_{tt}$ to the motors M1 to M8. Note that, when the target force $f_{St}$ is not set in the control apparatus 40, the command integration unit 43 drives the robot 1 in the position control mode.

As described above, the final target position calculation part 41c calculates the final target position $S_t$ including the first final target position and the second final target position from the final position calculated by the final position calculation part 41b and target position offset $S_{to}$. As below, referring to FIGS. 7 and 8, a method of calculating the target position offset $S_{to}$ by the final target position calculation part 41c will be explained.

Figure 7:
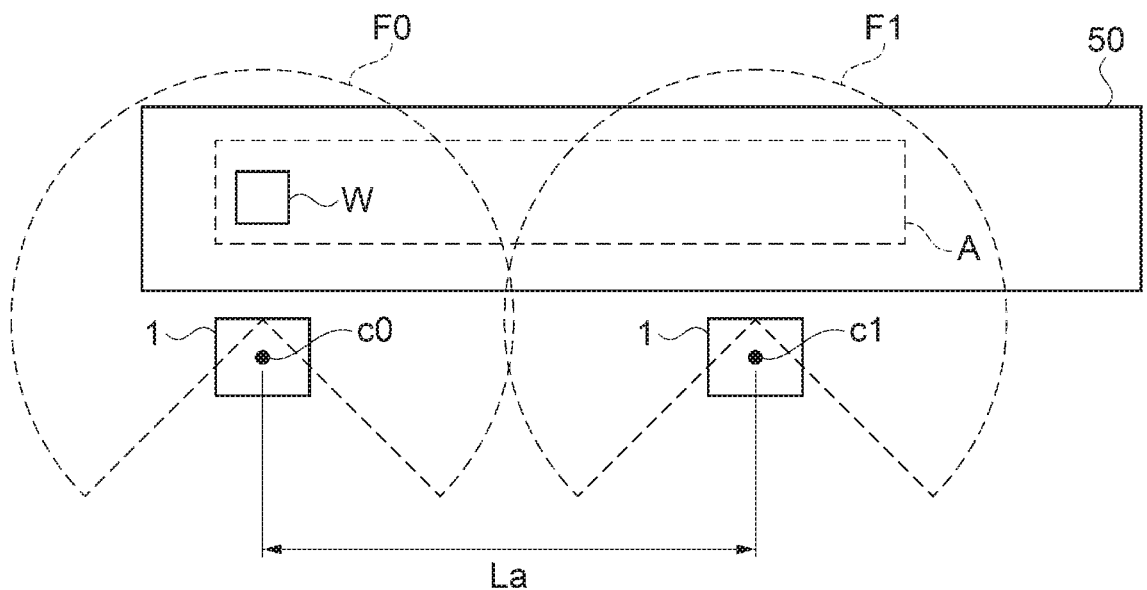
FIG. 7 is a schematic plan view for explanation of movement of a robot in work.

As shown in FIG. 7, it is assumed that work on the object W is completed while the object W is transported in a transport range A and the robot 1, i.e., the base 11 moves a distance La from a position c0 to a position c1. Ranges F0, F1 show movable ranges of the end effector 20 with reference to the base 11 when the robot 1 is placed in the positions c0, c1, respectively. The movable ranges of the end effector 20 may correspond to the above described first range and second range. The control apparatus 40 calculates the first commanded position without using the target position offset $S_{to}$ in the initial setting by the command. The robot 1 is located in the position c0 by the first commanded position at the start of work. The robot 1 starts work on the object W within the range F0 in the position c0 and completes the work on the object W within the range F1 in the position c1. The control apparatus 40 acquires and stores the respective positions of the end effector 20 moved by the first commanded position and the second commanded position at the respective times during the work via the first conversion unit U1. The respective positions of the end effector 20 moved during the work correspond to the transport range A.

Figure 8:
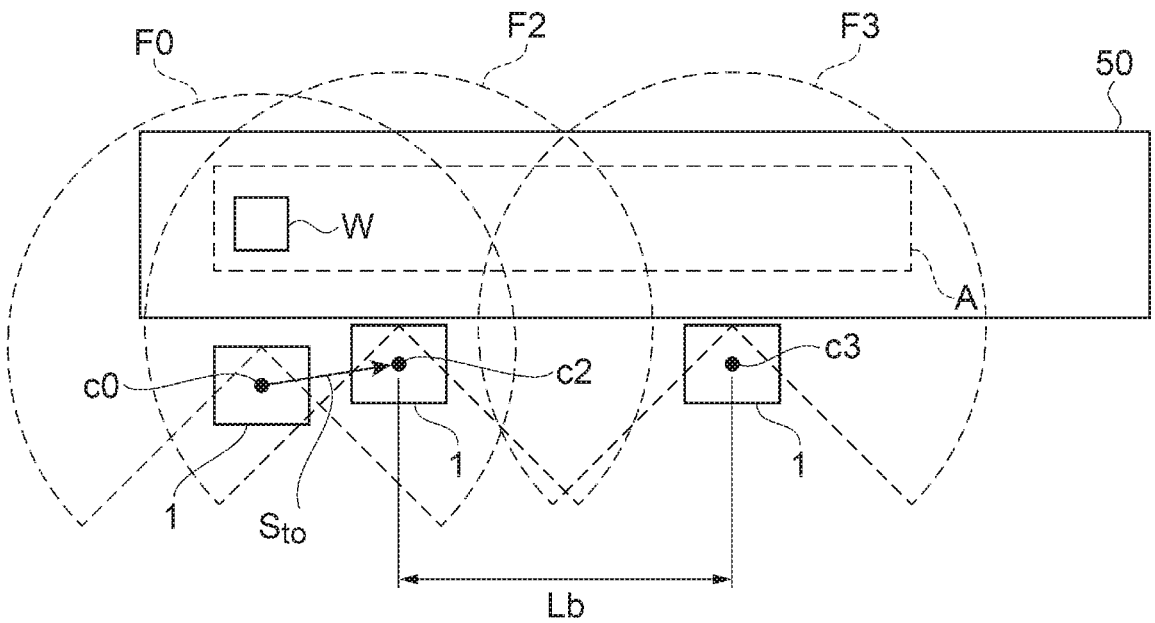
FIG. 8 is a schematic plan view for explanation of target position offset.

As shown in FIG. 8, the final target position calculation part 41c calculates a distance Lb as the minimum value of the distance that the base 11 moves based on the first commanded position and the second commanded position when the same work was performed at the previous time and the movable ranges of the end effector 20. That is, the final target position calculation part 41c calculates a path of the moving unit 12 in which the distance that the base moves during the work is the shortest based on the transport range A and the movable ranges of the end effector 20 with reference to the position of the base 11. The robot 1 starts work on the object W within a range F2 in a position c2 and completes the work on the object W within a range F3 in a position c3. While the moving unit 12 moves in the calculated path, the object W is constantly located within the movable ranges of the end effector 20. In the example shown in FIG. 8, the distance Lb is a distance from the position c2 of the robot 1 at the start of the work to the position c3 of the robot 1 at the completion of the work. The position c2 is located in a traveling direction of the object W relative to the position c0. At the start of work at which the object W enters the transport range A, the robot 1 is located in the position c2.

The final target position calculation part 41c calculates a difference between the position c0 corresponding to the first commanded position calculated in the initial setting and the position c2 corresponding to the start point of the distance Lb as the target position offset $S_{to}$. The final target position calculation part 41c calculates the first final target position and the second final target position from the final position calculated by the final position calculation part 41b and the target position offset $S_{to}$ calculated at the previous time. That is, the final target position calculation part 41c calculates the first final target position corrected by the target position offset $S_{to}$ and the second final target position that realizes the final position calculated by the final position calculation part 41b together with the first final target position. As described above, the final target position calculation part 41c determines the initial position of the base 11 at the start of the next work so that the movement amount of the moving unit 12 may be reduced based on the movable ranges of the end effector 20 with reference to the position of the base 11.

Note that the moving unit 12 in the embodiment is the AGV including the two driving wheels 121. Accordingly, to be driven in one direction, it is necessary that the moving unit 12 is adjusted in the orientation according to the one direction. As described above, when the moving unit has a restriction on the movement, the final target position calculation part 41c may calculate the target position offset $S_{to}$ in consideration of the restriction on the movement.

As below, referring to the flowchart in FIG. 9, an operation of the control apparatus 40 will be explained as an example of the method of controlling the robot 1 according to the embodiment.

First, at step S101, the position detection part 41a detects the position of the object W in the world coordinate system from the position of the object W in the image input from the position sensor 30.

At step S102, the final position calculation part 41b calculates the final position of the TCP at the completion of work in the world coordinate system from the position of the object W detected at step S101 and the command C created using the teaching apparatus 45.

At step S103, the final target position calculation part 41c calculates the final target position $S_t$ including the first final target position indicating the position of the moving unit 12 and the second final target position indicating the position of the manipulator 10 from the target position calculated at step S102. When the target position offset $S_{to}$ in the same work was previously calculated, the final target position calculation part 41c calculates the final target position $S_t$ from the target position and the target position offset $S_{to}$.

At step S104, the target position calculation part 41d calculates the target position $S_{tc}$ including the first target position of the moving unit 12 and the second target position of the manipulator 10 from the first final target position and the second final target position calculated at step S103. That is, the target position calculation part 41d calculates the first target positions with respect to each micro time until the moving unit 12 reaches the first final target position and the second target positions with respect to each micro time until the manipulator 10 reaches the second final target position at the respective times.

At step S105, the tracking correction amount calculation part 41e calculates the tracking correction amount $S_{tm}$ from the transport amount of the object W acquired using the transport sensor of the handler 50. Here, when the tracking offset $\Delta S_r$ in the same work was previously calculated by the tracking offset calculation part 42d, the tracking correction amount calculation part 41e calculates the tracking correction amount $S_{tm}$ from the transport amount of the object W and the tracking offset $\Delta S_r$. That is, the tracking correction amount calculation part 41e calculates the tracking correction amount $S_{tm}$ corrected by the tracking offset $\Delta S_r$.

At step S106, the tracking correction amount addition part 43a calculates the first tracking correction amount applied to the moving unit 12 and the second tracking correction amount applied to the manipulator 10 from the tracking correction amount $S_{tm}$ calculated at step S105.

At step S107, the force detection part 42b detects the acting force $f_S$ acting on the end effector 20 from the object W based on the output of the force sensor P. Specifically, the force detection part 42b calculates the acting force $f_S$ by providing gravity compensation to remove the component due to the gravity force to the force $f_{Sp}$ acquired from the force sensor P via the second conversion unit U2.

At step S108, the force control correction amount calculation part 42c calculates the force control correction amount $\Delta S$ for correction of the target position $S_{tc}$ to set the acting force $f_S$ to the target force $f_{St}$ from the acting force $f_S$ detected at step S107 and the target force $f_{St}$ calculated by the target force calculation part 42a.

At step S109, the force control correction amount addition part 43b calculates the first force control correction amount applied to the moving unit 12 and the second force control correction amount applied to the manipulator 10 from the force control correction amount $\Delta S$ calculated at step S108.

At step S110, the force control correction amount addition part 43b calculates the first commanded position from the first target position calculated at step S104, the first tracking correction amount calculated at step S106, and the first force control correction amount calculated at step S109.

At step S111, the force control correction amount addition part 43b calculates the second commanded position from the second target position calculated at step S104, the second tracking correction amount calculated at step S106, and the second force control correction amount calculated at step S109.

At step S112, the feedback control part 43c drives the moving unit 12 and the manipulator 10 based on the first commanded position calculated at step S110 and the second commanded position calculated at step S111.

At step S113, the control apparatus 40 determines whether or not the work on the object W was completed. For example, the control apparatus 40 determines whether or not the work was completed according to whether or not the current position of the TCP calculated from the positions of the moving unit 12 and the manipulator 10 detected in the position control unit 41 corresponds to the final target position $S_t$. When determining that the work was completed, the control apparatus 40 moves the processing to step S114 and, when determining that the work is not yet completed, returns the processing to step S104.

At step S114, the tracking offset calculation part 42d calculates the tracking offset $\Delta S_r$ as the statistic of the force control correction amounts $\Delta S$ from the force control correction amounts $\Delta S$ calculated at the respective steps S108.

At step S115, the final target position calculation part 41c calculates the target position offset $S_{to}$ based on the first commanded position calculated at step S110 and the second commanded position calculated at step S111. Specifically, the final target position calculation part 41c calculates the target position offset $S_{to}$ based on the first commanded positions and the second commanded positions acquired at the respective times during the work and the movable ranges of the end effector 20 stored in advance. The final target position calculation part 41c determines the initial position of the base 11 at the start of work by calculating the target position offset $S_{to}$ for correction of the first commanded positions.

Next, referring to the flowchart in FIG. 10, the processing at step S106 in the flowchart in FIG. 9 will be explained in detail.

First, at step S21, the tracking correction amount addition part 43a determines whether or not a condition setting that produces the first tracking correction amount applied to the moving unit 12 was made. The condition setting is determined according to e.g. an operation by the user on the input device of the teaching apparatus 45 in advance. When the condition setting was made, the tracking correction amount addition part 43a moves the processing to step S22 and, when the condition setting was not made, moves the processing to step S24.

At step S22, the tracking correction amount addition part 43a sets the tracking correction amount $S_{tm}$ calculated at step S105 as the first tracking correction amount. At step S23, the tracking correction amount addition part 43a sets the second tracking correction amount to zero and ends the processing at step S106.

At step S24, the tracking correction amount addition part 43a determines whether or not the target position $S_{tc}$ calculated at step S104 is out of the first range with reference to the base 11. When the target position $S_{tc}$ is out of the first range, the tracking correction amount addition part 43a moves the processing to step S22 and, when the target position $S_{tc}$ is not out of the first range, moves the processing to step S25.

At step S25, the tracking correction amount addition part 43a determines whether or not the tracking correction amount $S_{tm}$ calculated at step S105 is equal to or larger than the first threshold value. When the tracking correction amount $S_{tm}$ is equal to or larger than the first threshold value, the tracking correction amount addition part 43a moves the processing to step S22 and, when the tracking correction amount $S_{tm}$ is not equal to or larger than the first threshold value, moves the processing to step S26.

At step S26, the tracking correction amount addition part 43a sets the tracking correction amount $S_{tm}$ calculated at step S105 as the second tracking correction amount. At step S27, the tracking correction amount addition part 43a sets the first tracking correction amount to zero and ends the processing at step S106.

As described above, when the target position $S_{tc}$ is out of the first range with reference to the base 11 or the tracking correction amount $S_{tm}$ is equal to or larger than the first threshold value, the tracking correction amount addition part 43a sets the first tracking correction amount to the tracking correction amount $S_{tm}$. Thereby, the control apparatus 40 may selectively drive the moving unit 12 based on the tracking correction amount $S_{tm}$ when it is possible that the target position $S_{tc}$ is out of the movable ranges of the end effector 20. Thereby, the movement amount of the moving unit 12 during work may be efficiently reduced.

Note that the conditions by the determinations at step S24 and step S25 may be combined with each other. That is, the tracking correction amount addition part 43a may selectively set the tracking correction amount $S_{tm}$ as the first tracking correction amount when the target position $S_{tc}$ is out of the first range with reference to the base 11 and the tracking correction amount $S_{tm}$ is equal to or larger than the first threshold value. Thereby, the movement amount of the moving unit 12 during work may be further reduced.

Figure 11:
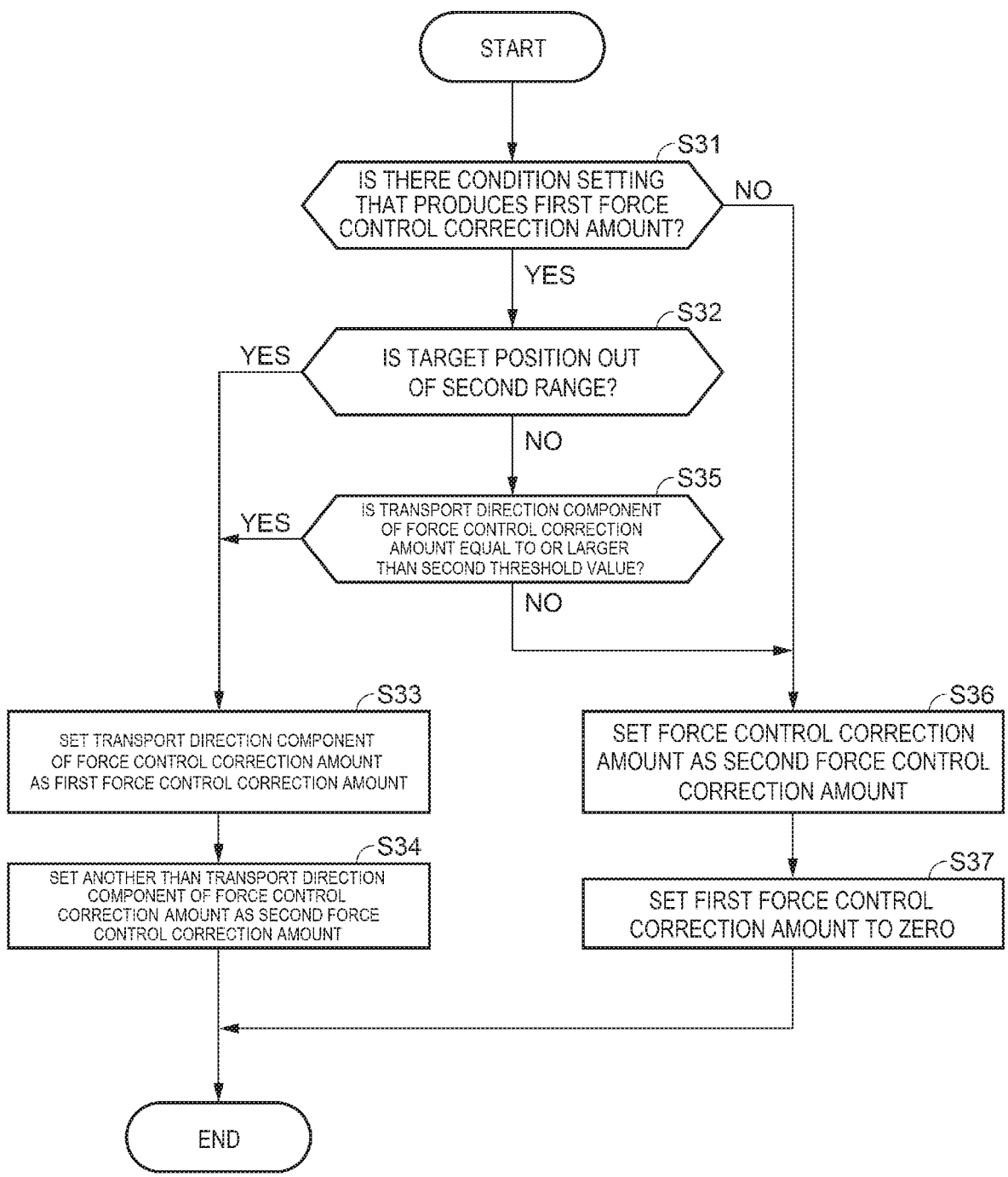
FIG. 11 is a flowchart for explanation of a method of determining a force control correction amount.

Next, referring to the flowchart in FIG. 11, the processing at step S109 in the flowchart in FIG. 9 will be explained in detail.

First, at step S31, the force control correction amount addition part 43b determines whether or not a condition setting that produces the first force control correction amount applied to the moving unit 12 was made. The condition setting is determined according to e.g. an operation by the user on the input device of the teaching apparatus 45 in advance. When the condition setting was made, the force control correction amount addition part 43b moves the processing to step S32 and, when the condition setting was not made, moves the processing to step S36.

At step S32, the force control correction amount addition part 43b determines whether or not the target position $S_{tc}$ calculated at step S104 is out of the second range with reference to the base 11. When the target position $S_{tc}$ is out of the second range, the force control correction amount addition part 43b moves the processing to step S33 and, when the target position $S_{tc}$ is not out of the second range, moves the processing to step S35.

At step S33, the force control correction amount addition part 43b sets the component of the force control correction amount ΔS in the path direction 52 as the first force control correction amount. At step S34, the force control correction amount addition part 43b sets another than the component of the force control correction amount ΔS in the path direction 52 as the second force control correction amount and ends the processing at step S109.

At step S35, the force control correction amount addition part 43b determines whether or not the component of the force control correction amount ΔS in the path direction 52 is equal to or larger than the second threshold value. When the component of the force control correction amount ΔS in the path direction 52 is equal to or larger than the second threshold value, the force control correction amount addition part 43b moves the processing to step S33 and, when the component of the force control correction amount ΔS in the path direction 52 is not equal to or larger than the second threshold value, moves the processing to step S36.

At step S36, the force control correction amount addition part 43b sets the force control correction amount ΔS as the second force control correction amount. At step S37, the force control correction amount addition part 43b sets the first force control correction amount to zero and ends the processing at step S109.

As described above, when the target position $S_{tc}$ is out of the second range with reference to the base 11 or the component of the force control correction amount ΔS in the path direction 52 is equal to or larger than the second threshold value, the force control correction amount addition part 43b selectively drive the moving unit 12 based on the component of the force control correction amount ΔS in the path direction 52. Thereby, the movement amount of the moving unit 12 during work may be efficiently reduced. Further, as a general tendency, the manipulator 10 has higher responsiveness than the moving unit 12 and stability may be degraded due to an influence by the road surface or the like. Accordingly, driving of the moving unit 12 based on the force control correction amount ΔS is minimized, and thereby, degradation of the accuracy of force control may be reduced.

Note that the conditions by the determinations at step S32 and step S35 may be combined with each other. That is, the force control correction amount addition part 43b may selectively drive the moving unit 12 based on the component of the force control correction amount ΔS in the path direction 52 when the target position $S_{tc}$ is out of the second range with reference to the base 11 and the component of the force control correction amount ΔS in the path direction 52 is equal to or larger than the second threshold value. Thereby, the movement amount of the moving unit 12 during work may be further reduced.

Modified Example

In the above described embodiment, the tracking correction amount $S_{tm}$ is calculated based on the transport amount of the object W by the handler 50, however, the amount may be further corrected using the movement amount of the moving unit 12. That is, in the modified example of the embodiment, the control apparatus 40 may control the end effector 20 to follow the object W by driving the manipulator 10 based on the target position $S_{tc}$ and the tracking correction amount $S_{tm}$ corrected by the movement amount of the moving unit 12 while driving the moving unit 12 along the path 51. In this manner, the end effector 20 follows the object W while the moving unit 12 moves in the path direction 52, and thereby, the possibility that the object W is out of the movable ranges of the end effector 20 before the work on the object W is completed may be reduced. The operations, configurations, and effects that will not be described as below are the same as those of the above described embodiment and the duplicated description will be omitted.

Figure 9:
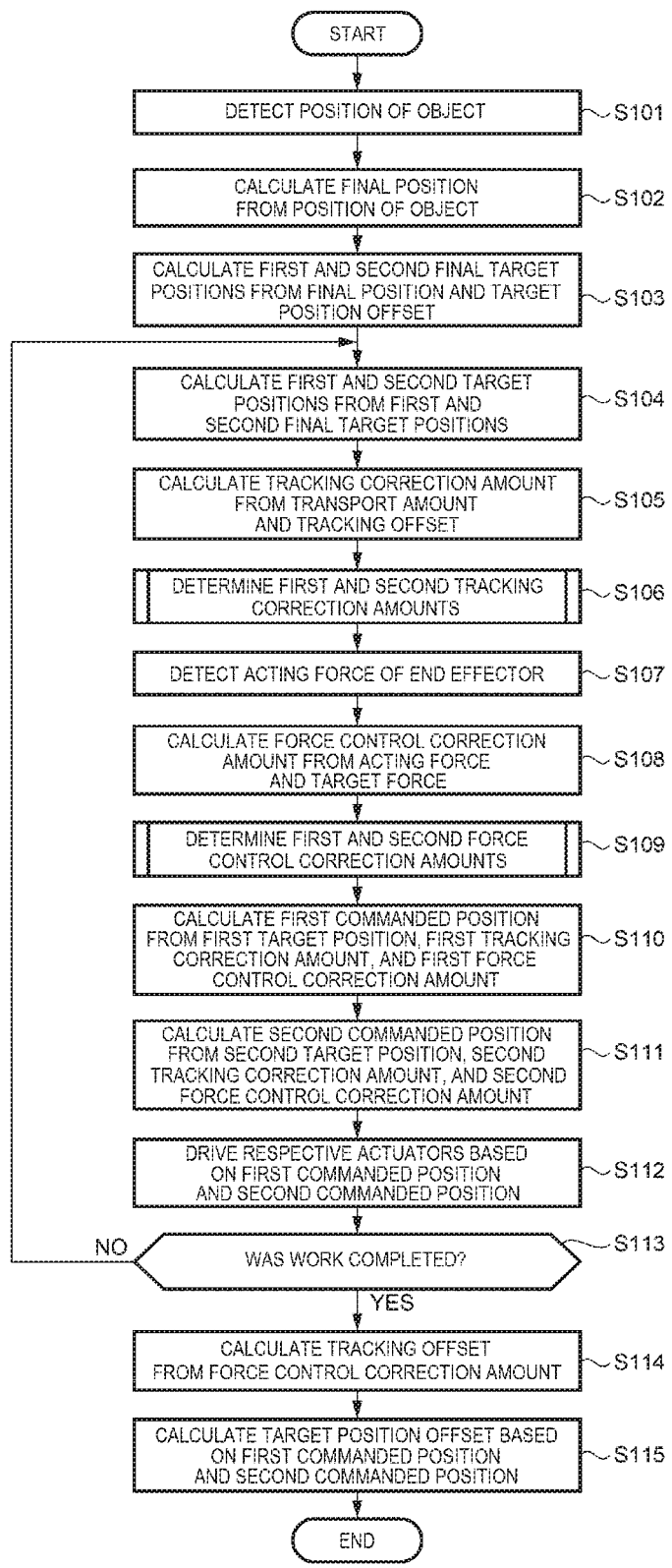
FIG. 9 is a flowchart for explanation of a method of controlling the robot.
Figure 10:
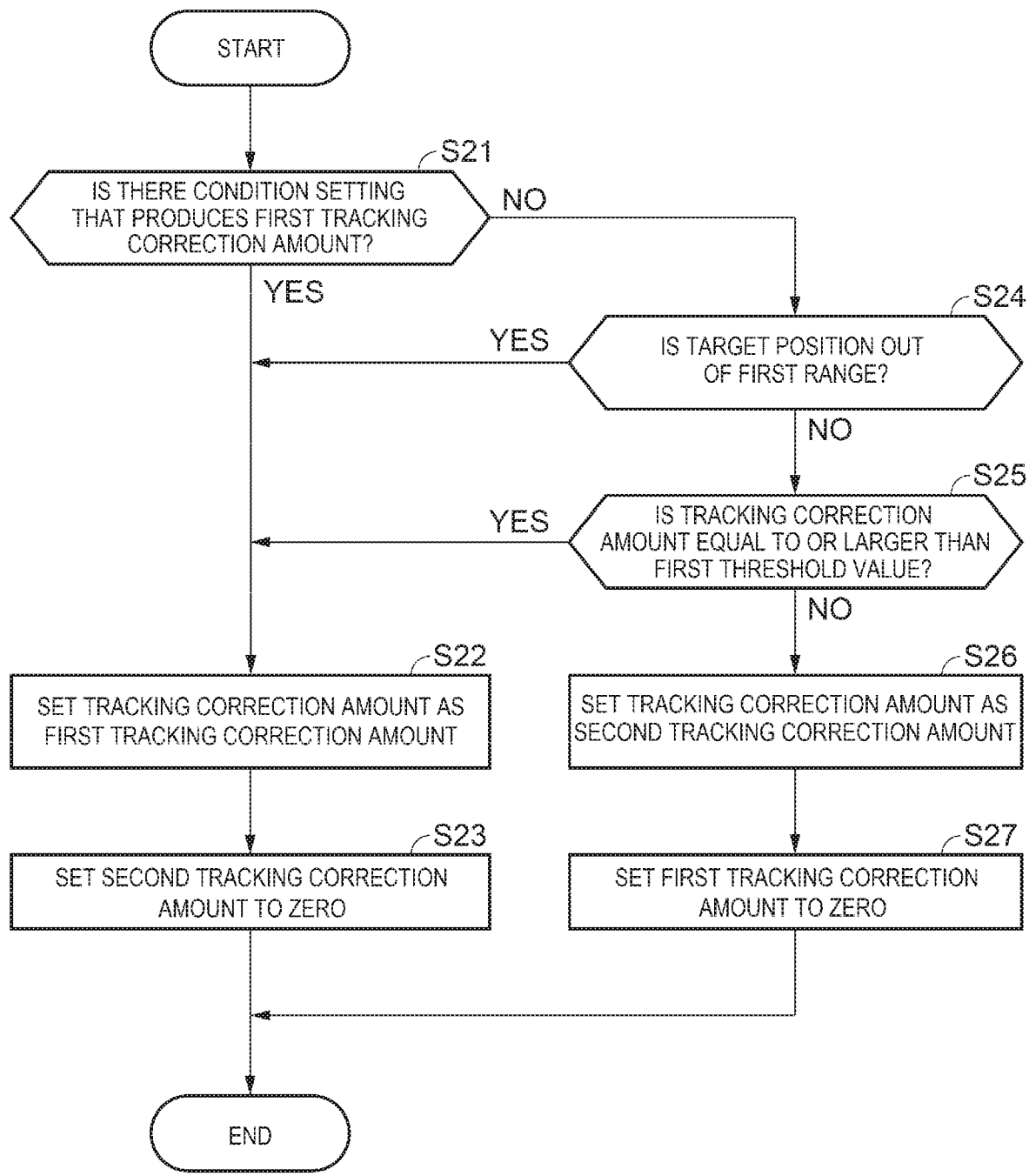
FIG. 10 is a flowchart for explanation of a method of determining a tracking correction amount.

The tracking correction amount calculation part 41e calculates the tracking correction amount $S_{tm}$ from the transport amount of the object W and the movement amount of the moving unit 12 as processing corresponding to step S105 in the flowchart of FIG. 9. The tracking correction amount $S_{tm}$ in the modified example of the embodiment corresponds to an amount obtained by correction of the tracking correction amount $S_{tm}$ in the above described embodiment using the movement amount of the moving unit 12. The tracking correction amount calculation part 41e may calculate the movement amount of the moving unit 12 based on the output of the encoders E1 to E8 or acquires the amount based on a command created in advance. When the tracking offset $\Delta S_r$ is calculated, the tracking correction amount calculation part 41e calculates the tracking correction amount $S_{tm}$ from the transport amount of the object W, the movement amount of the moving unit 12, and the tracking offset $\Delta S_r$. The tracking correction amount $S_{tm}$ corresponds to the movement amount of the object W in the base coordinate system.

The tracking correction amount addition part 43a calculates the first tracking correction amount and the second tracking correction amount from the tracking correction amount $S_{tm}$ calculated by the tracking correction amount calculation part 41e as processing corresponding to step S106 in the flowchart of FIG. 9.

Figure 12:
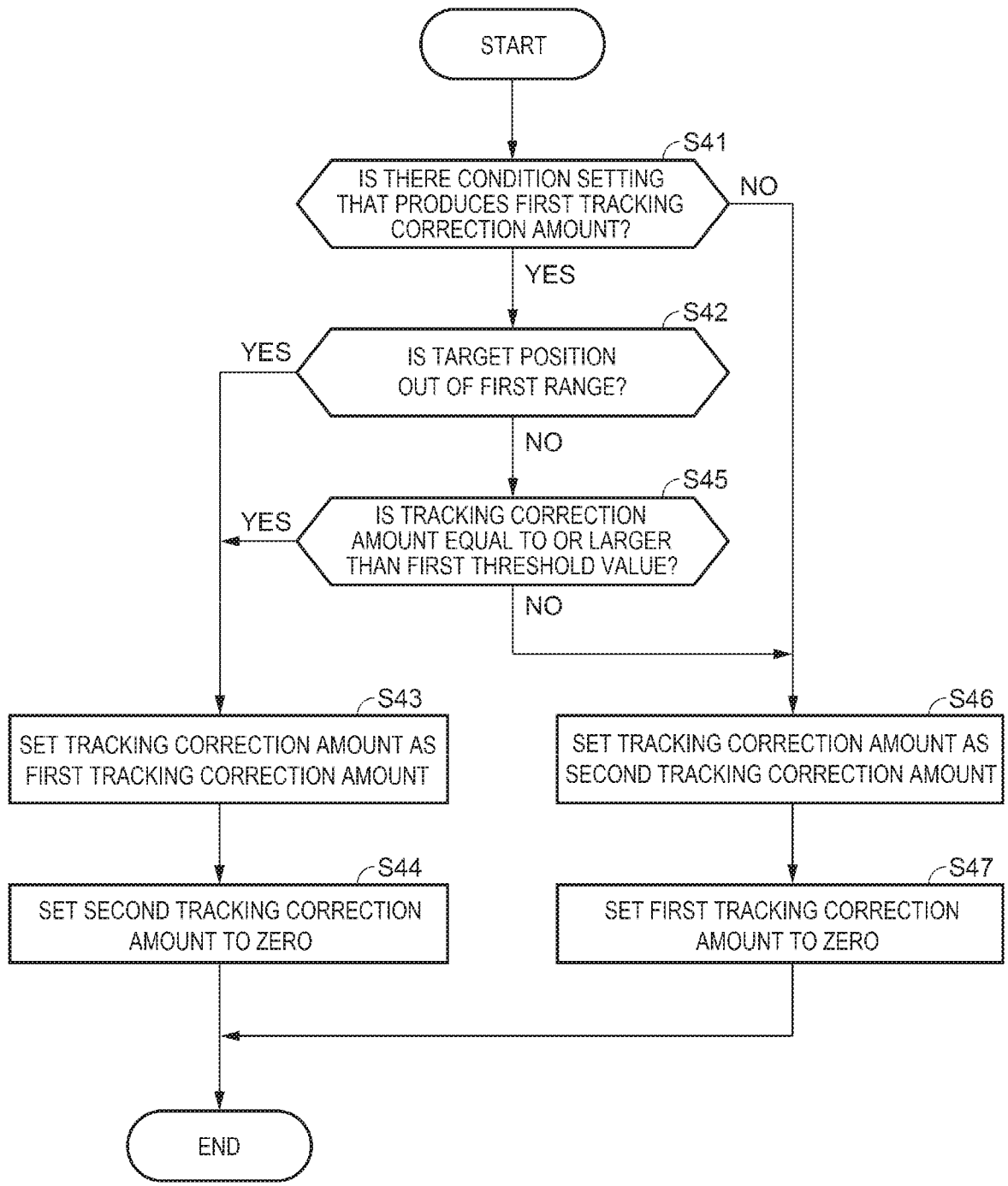
FIG. 12 is a flowchart for explanation of a modified example of the method of determining the tracking correction amount.

As below, referring to FIG. 12, the method of determining the first tracking correction amount and the second tracking correction amount by the tracking correction amount addition part 43a will be explained in detail.

First, at step S41, the tracking correction amount addition part 43a determines whether or not a condition setting that produces the first tracking correction amount applied to the moving unit 12 was made. When the condition setting was made, the tracking correction amount addition part 43a moves the processing to step S42 and, when the condition setting was not made, moves the processing to step S46.

At step S42, the tracking correction amount addition part 43a determines whether or not the target position $S_{tc}$ calculated by the target position calculation part 41d is out of the first range with reference to the base 11. When the target position $S_{tc}$ is out of the first range, the tracking correction amount addition part 43a moves the processing to step S43 and, when the target position $S_{tc}$ is not out of the first range, moves the processing to step S45.

At step S43, the tracking correction amount addition part 43a sets the tracking correction amount $S_{tm}$ calculated by the tracking correction amount calculation part 41e as the first tracking correction amount. At step S44, the tracking correction amount addition part 43a sets the second tracking correction amount to zero and ends the processing corresponding to step S106.

At step S45, the tracking correction amount addition part 43a determines whether or not the tracking correction amount $S_{tm}$ calculated by the tracking correction amount calculation part 41e is equal to or larger than the first threshold value. When the tracking correction amount $S_{tm}$ is equal to or larger than the first threshold value, the tracking correction amount addition part 43a moves the processing to step S43 and, when the tracking correction amount $S_{tm}$ is not equal to or larger than the first threshold value, moves the processing to step S46.

At step S46, the tracking correction amount addition part 43a sets the tracking correction amount $S_{tm}$ calculated by the tracking correction amount calculation part 41e as the second tracking correction amount. At step S47, the tracking correction amount addition part 43a sets the first tracking correction amount to zero and ends the processing corresponding to step S106.

As described above, when the target position $S_{tc}$ is out of the first range with reference to the base 11 or the tracking correction amount $S_{tm}$ is equal to or larger than the first threshold value, the tracking correction amount addition part 43a sets the first tracking correction amount to the tracking correction amount $S_{tm}$. Thereby, the control apparatus 40 may selectively drive the moving unit 12 based on the tracking correction amount $S_{tm}$ when it is possible that the target position $S_{tc}$ is out of the movable ranges of the end effector 20 while moving the moving unit 12 along the path 51. Thereby, the movement amount of the moving unit 12 based on the tracking correction amount $S_{tm}$ may be reduced during work.

Note that the conditions by the determinations at step S42 and step S45 may be combined with each other. That is, the tracking correction amount addition part 43a may selectively set the tracking correction amount $S_{tm}$ as the first tracking correction amount when the target position $S_{tc}$ is out of the first range with reference to the base 11 and the tracking correction amount $S_{tm}$ is equal to or larger than the first threshold value. Thereby, the movement amount of the moving unit 12 based on the tracking correction amount $S_{tm}$ during work may be further reduced.

OTHER EMBODIMENTS

For example, the robot 1 is not limited to the robot including the single manipulator 10 as the six-axis arm. The numbers of manipulators and end effectors of the robot 1, the degree of freedom of the manipulator, etc. may be arbitrarily changed. For example, the robot 1 may be an orthogonal robot, horizontal articulated robot, vertical articulated robot, dual-arm robot, or the like. Similarly, the moving unit 12 may be a device movable along the path 51. The moving unit 12 may be a legged robot, four-wheel independent drive vehicle, steering vehicle, orthogonal robot, or the like. In addition, the control apparatus 40 is not limited to the configuration that acquires the movement amount of the moving unit 12 from the encoders E7, E8 of the moving unit 12. The movement amount of the moving unit 12 may be acquired using various sensors including an inertial measurement unit (IMU), positioning system, laser range sensor, and camera. For example, the force sensor P is not limited to the force sensor, but the force acting on the end effector 20 may be estimated using torque sensors for the respective axes. For example, the transport amount of the object W from time T to the present may be calculated from the position sensor 30 without using the transport amount sensor.

As below, the details derived from the above described embodiments will be described as the respective embodiments.

A first embodiment is a method of controlling a robot that performs work using an end effector on an object transported along a predetermined path by a handler and includes a manipulator supporting the end effector, a base supporting the manipulator, and a moving unit moving the base by a control apparatus, and the method includes acquiring a position of the object using a position sensor, calculating a target position of the end effector based on the position of the object, acquiring a transport amount of the object by the handler, calculating a tracking correction amount for correction of the target position in correspondence with the transport amount, controlling the end effector to follow the object by driving the manipulator based on the target position and driving the moving unit based on the tracking correction amount, acquiring an acting force acting on the end effector from the object using a force sensor, calculating a force control correction amount for correction of the target position to set the acting force to a predetermined target force, and controlling the acting force from the object to be the predetermined target force by driving the manipulator based on the force control correction amount.

According to the first embodiment, the moving unit is driven based on the tracking correction amount, and thereby, the base is moved along the path. Therefore, the possibility that the object is out of a movable range of the end effector before completion of work on the object may be reduced.

In a second embodiment, in the first embodiment, when the target position is out of a first range with reference to a position of the base, the moving unit is driven based on the tracking correction amount.

According to the second embodiment, the moving unit is selectively driven based on the tracking correction amount, and thereby, a movement amount of the moving unit may be reduced.

In a third embodiment, in the first or second embodiment, when the tracking correction amount is equal to or larger than a first threshold value, the moving unit is driven based on the tracking correction amount.

According to the third embodiment, the moving unit is selectively driven based on the tracking correction amount, and thereby, the movement amount of the moving unit may be reduced.

A fourth embodiment is a method of controlling a robot that performs work using an end effector on an object transported along a predetermined path by a handler and includes a manipulator supporting the end effector, a base supporting the manipulator, and a moving unit moving the base by a control apparatus, and the method includes acquiring a position of the object using a position sensor, calculating a target position of the end effector based on the position of the object, acquiring a transport amount of the object by the handler, calculating a tracking correction amount for correction of the target position in correspondence with the transport amount, controlling the end effector to follow the object by driving the manipulator based on the target position, the tracking correction amount, and a movement amount of the moving unit while driving the moving unit along the path, acquiring an acting force acting on the end effector from the object using a force sensor, calculating a force control correction amount for correction of the target position to set the acting force to a predetermined target force, and controlling the acting force from the object to be the predetermined target force by driving the manipulator based on the force control correction amount.

According to the fourth embodiment, the moving unit is driven along the path, and thereby, the base is moved along the path. Therefore, the possibility that the object is out of the movable range of the end effector before completion of work on the object may be reduced.

In a fifth embodiment, in any one of the first to fourth embodiments, when the force control correction amount is used for correction of the target position in a path direction along the path, the moving unit is driven based on a component of the force control correction amount in the path direction and the manipulator is driven based on another than the component of the force control correction amount in the path direction.

According to the fifth embodiment, the moving unit is driven based on the component of the force control correction amount in the path direction, and thereby, the possibility that the object is out of the movable range of the end effector before completion of work on the object may be reduced.

In a sixth embodiment, in the fifth embodiment, when the target position is out of a second range with reference to a position of the base, the moving unit is driven based on the component of the force control correction amount in the path direction.

According to the sixth embodiment, the moving unit is selectively driven based on the force control correction amount, and thereby, the movement amount of the moving unit may be reduced. Further, driving of the moving unit based on the force control correction amount is minimized, and thereby, degradation of accuracy of force control may be reduced.

In a seventh embodiment, in the fifth or sixth embodiment, when the component of the force control correction amount in the path direction is equal to or larger than a second threshold value, the moving unit is driven based on the component of the force control correction amount in the path direction.

According to the seventh embodiment, the moving unit is selectively driven based on the force control correction amount, and thereby, the movement amount of the moving unit may be reduced. Further, driving of the moving unit based on the force control correction amount is minimized, and thereby, degradation of accuracy of force control may be reduced.

In an eighth embodiment, in any one of the first to seventh embodiments, an initial position of the base at a start of the work is determined to reduce a movement amount of the moving unit based on a movable range of the end effector with reference to a position of the base.

According to the eighth embodiment, driving of the moving unit is suppressed, and thereby, degradation of accuracy of force control may be reduced.

What is claimed is:

1. A method of controlling a robot that performs work using an end effector on an object transported along a predetermined path by a handler and includes a manipulator supporting the end effector, a base supporting the manipulator, and a moving unit moving the base by a control apparatus, the method comprising:
   acquiring a position of the object using a position sensor;
   calculating a target position of the end effector based on the position of the object;
   acquiring a transport amount of the object by the handler;
   calculating a tracking correction amount for correction of the target position in correspondence with the transport amount;
   controlling the end effector to follow the object by driving the manipulator based on the target position and driving the moving unit based on the tracking correction amount;

acquiring an acting force acting on the end effector from the object using a force sensor;

calculating a force control correction amount for correction of the target position to set the acting force to a predetermined target force; and controlling the acting force from the object to be the predetermined target force by driving the manipulator based on the force control correction amount.

2. The method according to claim 1, wherein when the target position is out of a first range with reference to a position of the base, the moving unit is driven based on the tracking correction amount.

3. The method according to claim 1, wherein when the tracking correction amount is equal to or larger than a first threshold value, the moving unit is driven based on the tracking correction amount.

4. The method according to claim 1, wherein when the force control correction amount is used for correction of the target position in a path direction along the path, the moving unit is driven based on a component of the force control correction amount in the path direction and the manipulator is driven based on another than the component of the force control correction amount in the path direction.

5. The method according to claim 4, wherein when the target position is out of a second range with reference to a position of the base, the moving unit is driven based on the component of the force control correction amount in the path direction.

6. The method according to claim 4, wherein when the component of the force control correction amount in the path direction is equal to or larger than a second threshold value, the moving unit is driven based on the component of the force control correction amount in the path direction.

7. The method according to claim 1, wherein an initial position of the base at a start of the work is determined to reduce a movement amount of the moving unit based on a movable range of the end effector with reference to a position of the base.

8. A method of controlling a robot that performs work using an end effector on an object transported along a predetermined path by a handler and includes a manipulator supporting the end effector, a base supporting the manipulator, and a moving unit moving the base by a control apparatus, the method comprising:

acquiring a position of the object using a position sensor;

calculating a target position of the end effector based on the position of the object;

acquiring a transport amount of the object by the handler;

calculating a tracking correction amount for correction of the target position in correspondence with the transport amount;

controlling the end effector to follow the object by driving the manipulator based on the target position, the tracking correction amount, and a movement amount of the moving unit while driving the moving unit along the path;

acquiring an acting force acting on the end effector from the object using a force sensor;

calculating a force control correction amount for correction of the target position to set the acting force to a predetermined target force; and controlling the acting force from the object to be the predetermined target force by driving the manipulator based on the force control correction amount.

* * * * *